US012783037B2

(12) United States Patent
Socarras et al.

(10) Patent No.: US 12,783,037 B2
(45) Date of Patent: Nov. 3, 2026

(54) HARDWARE PERFORMANCE INFORMATION FOR POWER MANAGEMENT

(71) Applicant: Apple Inc., Cupertino, CA (US)

(72) Inventors: Angel E. Socarras, Orlando, FL (US); Ben D. Jarrett, Austin, TX (US); Jason P. Jane, Morgan Hill, CA (US); Thomas B. Pringle, Winter Park, FL (US); Andrea Gianarro, London (GB); Jackson Dsouza, Fremont, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 18/807,525

(22) Filed: Aug. 16, 2024

(65) Prior Publication Data

US 2025/0103122 A1 Mar. 27, 2025

Related U.S. Application Data

(60) Provisional application No. 63/585,406, filed on Sep. 26, 2023.

(51) Int. Cl.

| | |
|---|---|
| ***G06F 1/00*** | (2006.01) |
| ***G06F 1/3206*** | (2019.01) |
| ***G06F 11/34*** | (2006.01) |
| ***G06F 11/362*** | (2025.01) |
| *G06F 1/3203* | (2019.01) |

(52) U.S. Cl.

CPC .......... *G06F 1/3206* (2013.01); *G06F 11/348* (2013.01); *G06F 11/3636* (2013.01); *G06F 1/3203* (2013.01)

(58) Field of Classification Search

CPC .. G06F 1/3206; G06F 11/348; G06F 11/3636; G06F 2201/88; G06F 1/206; G06F 1/324; G06F 1/3243; G06F 11/3024; G06F 11/3409; G06F 11/3466

See application file for complete search history.

(56) References Cited

U.S. PATENT DOCUMENTS

| | | | | |
|---|---|---|---|---|
| 6,895,520 | B1 * | 5/2005 | Altmejd | G06F 1/3203 713/320 |
| 9,830,247 | B2 | 11/2017 | Ivan et al. | |
| 10,037,073 | B1 * | 7/2018 | Catovic | G06F 1/3206 |

(Continued)

*Primary Examiner* — Volvick Derose

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to power management in a processing circuit that includes a set of functional blocks and performance counter registers configured to store utilization values indicative of utilization of associated ones of the set of functional blocks. A register interface circuit is configured to periodically sample the processing circuit to obtain aggregated utilization values generated from utilization values stored in the performance counter registers and write the aggregated utilization values to the set of trace buffer. A power management processor is configured to utilize a set of information stored in the set of trace buffers to determine whether to change a performance state of the processing circuit, the set of information including time-domain and frequency-domain representations of utilization of the processing circuit. In other embodiments, a functional block that is a hardware limiter of the processing circuit may be determined.

20 Claims, 15 Drawing Sheets

(56) References Cited

U.S. PATENT DOCUMENTS

| | | | | |
|---|---|---|---|---|
| 10,503,624 | B1 * | 12/2019 | Habusha | G06F 11/348 |
| 10,545,560 | B2 | 1/2020 | Mahindru et al. | |
| 11,474,924 | B2 | 10/2022 | Haberstro | |
| 11,556,162 | B2 * | 1/2023 | Wei | G06F 1/3206 |
| 11,669,146 | B2 | 6/2023 | Abu Salah et al. | |
| 2004/0163000 | A1 * | 8/2004 | Kuhlmann | G06F 1/3203 713/300 |
| 2005/0198635 | A1 * | 9/2005 | Olszewski | G06F 11/3423 718/100 |
| 2011/0291746 | A1 * | 12/2011 | Ibrahim | G06F 1/3287 702/61 |
| 2013/0013911 | A1 * | 1/2013 | Gustafsson | G06F 1/3203 713/100 |
| 2018/0101216 | A1 * | 4/2018 | Mahindru | G06F 9/4893 |
| 2018/0349146 | A1 * | 12/2018 | Iwamoto | G06F 9/461 |
| 2019/0041962 | A1 * | 2/2019 | Ananthakrishnan | G06F 1/324 |
| 2020/0319690 | A1 * | 10/2020 | Sodhi | G06F 1/28 |
| 2020/0379864 | A1 * | 12/2020 | Haberstro | G06T 15/005 |
| 2021/0208663 | A1 * | 7/2021 | Cooper | G06F 1/28 |
| 2022/0214737 | A1 * | 7/2022 | Abu Salah | G06F 1/3296 |
| 2025/0307100 | A1 * | 10/2025 | George | G06F 11/3024 |
| 2025/0378281 | A1 * | 12/2025 | Bapat | G06F 40/20 |

* cited by examiner

HARDWARE PERFORMANCE INFORMATION FOR POWER MANAGEMENT

CROSS REFERENCE TO RELATED APPLICATIONS

This application claims priority to U.S. Provisional Application No. 63/585,406 entitled "Hardware Performance Information for Power Management" filed on Sep. 26, 2023, which is incorporated by reference herein in its entirety.

BACKGROUND

Technical Field

This disclosure relates generally to computer systems, and more particularly to control of performance states of processing circuits within such computer systems.

Description of Related Art

P-states, also known as power states or performance states, refer to the different operating frequencies and voltages at which a computer processing element within a computer system can run (e.g., 0.75 V and 700 MHZ). Controlling these states allows a computer system to dynamically adjust its power consumption and performance levels based on the current workload and system requirements. By adjusting the operating frequency and voltage, a computer system can scale its power consumption up or down, depending on the workload demands. This flexibility allows a computer system to conserve power when idle or under light loads, thus reducing energy consumption and heat generation. On the other hand, during heavy workloads, the computer system can increase its frequency and voltage to deliver higher performance. This capability can be particularly important in mobile devices and laptops, where battery life is a critical factor.

DETAILED DESCRIPTION

Figure 1:
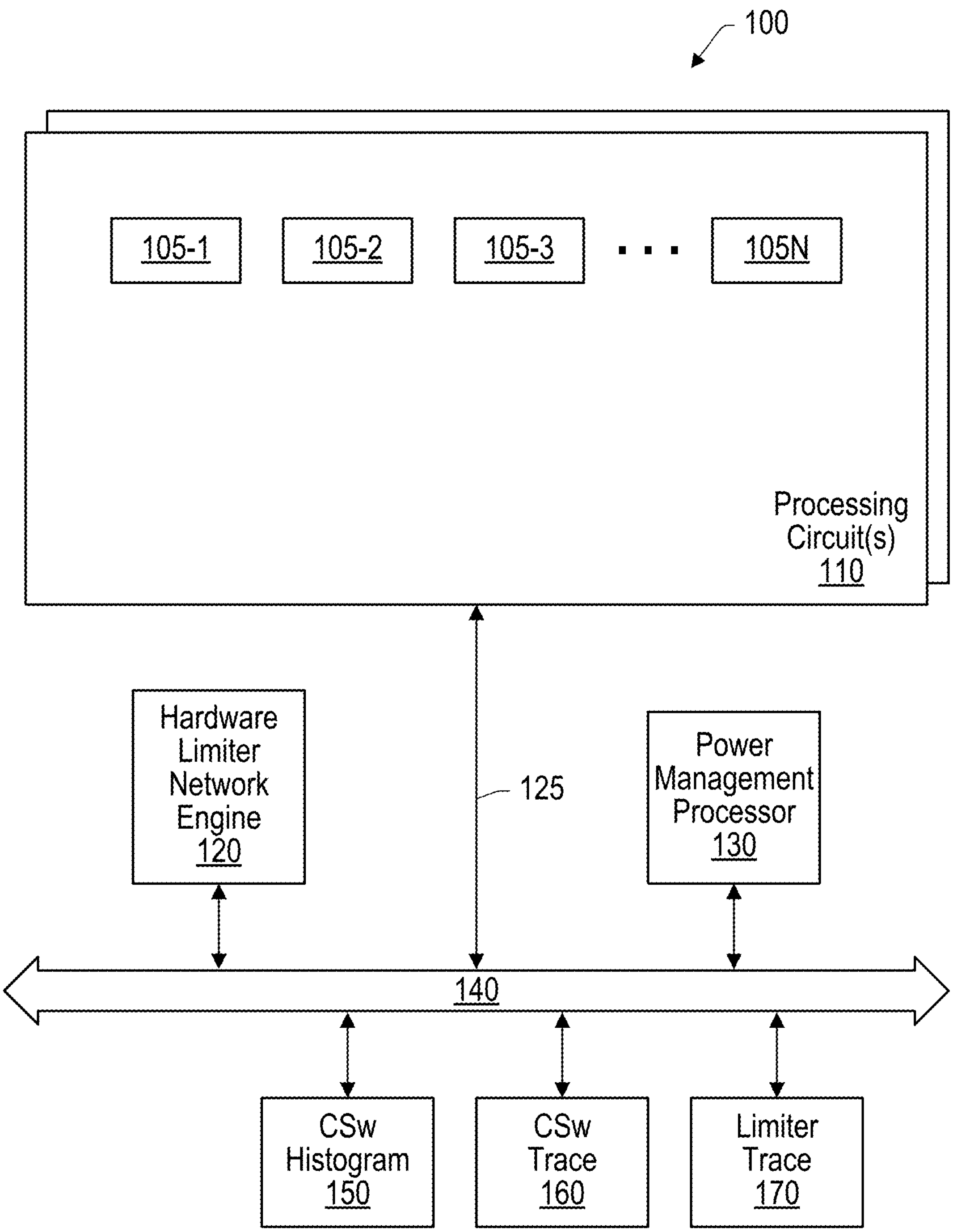
FIG. 1 is a block diagram of one embodiment of a computer system with a power management processor.

Hardware performance counters are specialized registers or circuits present in computer processors. These counters are designed to measure and track various performance-related events and metrics occurring within a processing circuit. Hardware performance counters provide valuable insights into the behavior and efficiency of the processing circuit during program execution. Hardware performance counters are particularly useful in identifying performance bottlenecks and understanding the behavior of the processing circuit under different workloads. In the context of a graphics processing unit (GPU), for example, performance counters can be used to capture the utilization of the individual engines or other circuits or sub-circuits of the GPU. (Generally speaking, a circuit with which a performance counter register is associated can be referred to as a "functional block," a "functional block circuit" a "sub-circuit," etc.) This approach allows a design team to run a benchmark program that has a known type of processing load, and then interrogate performance counters after the benchmark has concluded to determine during a post-processing phase whether the GPU was generally under-utilized, over-utilized, balanced, etc. It is to be understood that any references in this disclosure to a "GPU" are understood to be more broadly applicable to any suitable type of processing circuit.

But while post-processing analysis is useful in terms of making design changes and configuration settings, present application recognizes the desirability of having access to utilization information for processing circuit subcomponents (e.g., GPU engines) and making performance state decisions based on this utilization information in in real-time. Accordingly, the present disclosure describes techniques for rapidly reading utilization information and then acting on this information, which may include both aggregated and non-aggregated values, using a performance controller within a power management processor. In one embodiment of this paradigm, average utilization may be captured for some time period and then made available to a performance controller configured to make decisions relating to the p-state of a processing circuit. For example, the power management processor might determine that if the utilization of the GPU is past some threshold, say 95%, that the GPU should be transitioned to a higher p-state.

But as detailed below, it is recognized that such a transition may not always be the appropriate decision. In some cases, even though the GPU may be on approximately 95% of the time or more during some sampling interval, it may not be operating in an efficient manner. For example, the computer system may be constrained by current memory bandwidth, meaning that the demand on the memory system exceeds its current capacity. Increasing the p-state in such a memory-constrained system will not result in improved performance. In fact, making the GPU run faster through an increase in p-state can lead to more requests for memory bandwidth, and even longer waits for memory. It is recognized that relying on average processing element utilization alone can also be similarly deficient in other cases depending on which subcomponents are currently heavily utilized at a given point in time.

To address these scenarios and take advantage of these realizations, an implementation is proposed in which additional types of utilization data is collected and then utilized by a power management processor. In some embodiments, frequency-domain and time-domain representations of utilization may be collected and acted upon. For example, frequency-domain information for a processing circuit may take the form of a histogram that indicates the prevalence of different utilization bins during a sampling interval (e.g., the number of samples between 0-9.9% utilization, 10-19.9% utilization, etc.). Similarly, time-domain information may take the form of a trace that indicates the change in utilization during the sampling interval.

In other embodiments, information may be collected that determines what circuitry within the processing circuit currently constitutes the "hardware limiter." As used herein, "hardware limiter" refers to a piece of hardware within a larger circuit that, at a given point in time, is the performance bottleneck for the larger circuit. As will be described, this may be determined in some embodiments by ascertaining performance counter data indicative of the amount of work and the amount of stalling being performed by different types of circuits within the larger circuit. (The hardware limiter may thus be any of the various engines, functional block circuits, sub-circuits, etc. within a given processing circuit.) In some embodiments, the circuitry identified as the hardware limiter may have a 100% sensitivity between frequency and performance, meaning that an X percent decrease in frequency would also result in an X percent decrease in performance. Additional performance counter information can include individual utilization information for each component. Thus, in addition to aggregated utilization information, a processing circuit can access individual utilization information for components of the processing circuit.

As will be described, use of one or more of these types of utilization information, in addition to use of average utilization data, can lead to more optimal performance management decisions with respect to a processing circuit. Applying these techniques in the context of a GPU, in combination with accumulating GPU utilization data on a more frequent basis (e.g., multiple times per frame), can allow a power management processor to make more intelligent decisions, including when would the most efficient time to change p-states. Thus, instead of relying merely on whether a processing circuit was on for some percentage of a sampling interval, this approach allows more visibility into time and frequency information relating to utilization, as well the internal limits of subcomponents of the processing circuit.

This approach is illustrated with respect to FIG. 1, which depicts a computer system 100 having one or more processing circuits 110, each of which includes a set of performance counters 105 (exemplified by reference numerals 105A-N). Computer system 100 further includes a hardware limiter network engine 120 and a power management processor 130. These circuits are coupled to processing circuit(s) 110 via an interconnect 140. Computer system further includes Cswitch histogram circuit 150, Cswitch trace circuit 160, and limiter trace circuit 170.

Generally speaking, processing circuit 110 may be any type of processor within computer system that is sufficiently complex to warrant sophisticated power management techniques such as those disclosed herein. One type of processing circuit 110 frequently described herein to illustrate the disclosed techniques is a graphics processing unit (GPU). An example of GPU architecture is described below with respect to FIGS. 2A-B. But many of the teachings of the present disclosure are applicable beyond the context of GPUs, such as to central processing units (CPUs).

The purpose of set of performance counters 105 is to obtain an understanding of the current utilization of processing circuit 110. Accordingly, performance counters 105 may be distributed in different locations throughout processing circuit 110 in order to gain a sufficient amount of information to make informed power management decisions. In some embodiments, processing circuit may have a defined set of sub-blocks, engines, etc.—individual ones of performance counters may be associated with each sub-block, for example. (Thus, performance counters 105A-1, 105B-1 and 105C-1 might correspond to a first sub-block while performance counters 105A-N, 105B-N, and 105C-N might correspond to an nth sub-block.) In short, any suitable distribution of performance counters 105 is contemplated.

One type of performance counter 105 that is contemplated is configured to store an indication of switching capacitance, or, alternately, a value usable to compute switching capacitance (also referred to as Cswitch or Csw). Switching capacitance is one of the quantities (along with leakage current) that designers attempt to improve to optimize power consumption on a silicon device. Power consumption is nominally computed as frequency times voltage squared. But in a typical silicon device, not all transistors are running at the same frequency. Furthermore, some transistors may be clock-gated, and thus not utilized at all. Switching capacitance, as is understood in the art, is a metric that is indicative of power consumption but which strips out the notion of frequency and voltage. Switching capacitance (sometimes also known as Cac) indicates on average how many transitions are being made on every transistor's output times the amount of capacitance.

Hardware limiter network engine 120, in one embodiment, is a circuit that is configured to periodically read and accumulate the values stored in performance counters 105 using register interface 125, perform basic processing, and write the results via interconnect 140 to data memories such as Csw histogram circuit 150, Csw trace circuit 160, and limiter trace circuit 170. Memories 150, 160, and 170 can be referred collectively to as a set of "trace buffer circuits." Circuits 150, 160, and 170 are memory circuits that can be accessed by power management processor 130 to make power management decisions. Note that in some embodiments, the functionality of limiter network engine 120 may be included in power management processor 130. Register interface 125 is described in more detail with respect to FIGS. 3A-C.

Performance counters 105 may be sampled at any suitable interval. In one implementation in which processing circuit 110 is a GPU, p-state decisions might be made approximately every 8 milliseconds in conjunction with a 120 Hz display device. In other implementations, counters 105 may be sampled more frequently, such as every other, full, half, or quarter of a millisecond. A smaller sampling period, in certain embodiments, can be advantageous in terms of making a more accurate determination of the utilization of various portions of the GPU, particularly when residency on a display device has been established—that is, the graphical elements that were present on a display for the last few periods that will continue to be present for the next few periods.

As noted, limiter engine 120 is configured to store the results of reading and accumulating performance counters 105 in memory circuits such as those indicated by reference numerals 150, 160, and 170. These circuits can be used to perform different operations on the accumulated data, thus presenting power management processor 130 with different types of information about the utilization of processing circuit 110. For example, Cswitch histogram circuit 150 presents a frequency-domain view of recent utilization data, while Cswitch trace circuit 160 presents a time-domain view of recent utilization data. One particular embodiment in which these two functions are implemented as a single circuit is described in more detail with respect to FIGS. 4A-B. Limiter trace circuit 170 is configured to indicate which portions of processing circuit 110 are most heavily utilized. Additional types of memory circuits that store different types of utilization information are possible in other embodiments.

In some embodiments, power management processor 130 includes several different internal controllers. One of particular interest in this application is a performance controller; other components may include a thermal controller and a throttling controller. These controllers may run independently as different threads within processor 130. Processor 130, in some embodiments, is configured to make the most conservative power management decision based on information provided by its constituent controllers. For example, under this paradigm, if the performance controller provides information that a transition should be made to a higher-performance p-state but the thermal controller provides information indicating that processing circuit 110 is too hot, controller 130 would transition to a lower p-state.

As noted, in the implementation shown in FIG. 1, limiter engine 120 is configured to perform repetitive register reads, while power management processor 130 is configured to perform algorithms in order to make power management decisions. Whatever the distribution of work, engine 120 and processor 130 collectively operate to read and accumulate performance counters 105. This accumulation may acquire data for hardware blocks within multiple instances of processing circuit 110 in some embodiments. Engine 120 then writes the results to a set of buffers (e.g., circuits 150, 160, and 170) that are available for access by processor 130. As noted, these buffers present different views of the utilization data to processor 130. Together, these buffers provide a footprint of the utilization of the processing circuit over some sampling period (e.g., during a time period corresponding to a graphics frame).

Processor 130 is configured to execute an algorithm that uses the data stored in these blocks representing the historical workload in various ways to project the next p-state. A portion of that algorithm looks for a trend in power utilization, and once identified, the algorithm continues trend identification. Concurrently, the algorithm begins making power determinations based on the trend. These power determinations may be made based on information found in one or more of blocks 150, 160, and 170. A power determination may be made, for instance, by determining whether the current trend is stable (e.g., based on the values of the hardware limiters in block 170 and the Csw trace in block 160). If processor 130 detects a sample that diverges from the current trend, the algorithm can fall back to a baseline decision-making process as to what p-state to transition to, and then return to searching for the next trend. In some embodiments, processor 130 can also be configured to implement a predictive algorithm that will allow processor 130 to look at the history of the workload of processing circuit 110 and correctly predict whether that behavior will continue (and subsequently make a p-state determination based on this predicted trend). Processor 130 can also be trained to increase the probability of making the optimal power management decision based on the history of the workload.

Figure 2A:
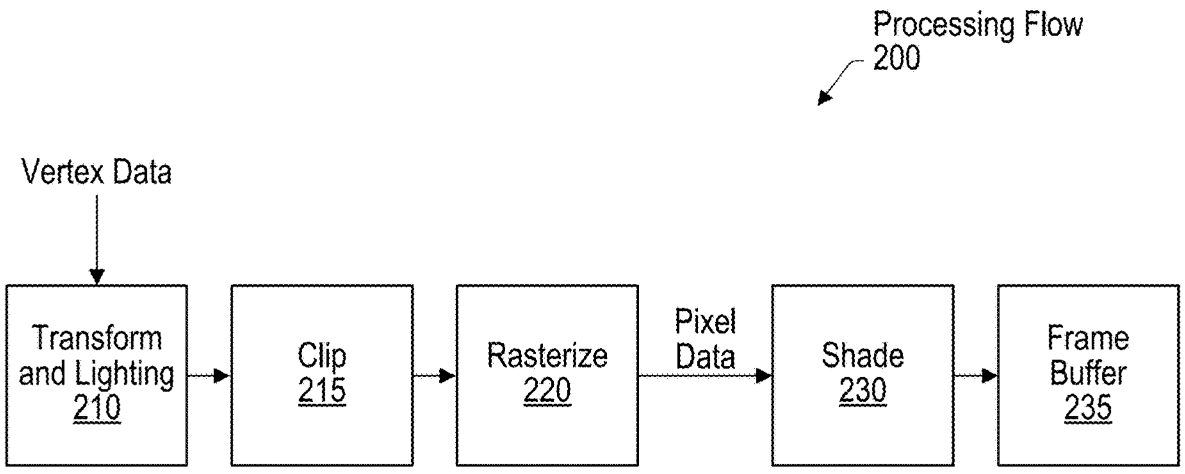
FIG. 2A is a diagram illustrating an overview of one embodiment of a graphics processing pipeline.
Figure 2B:
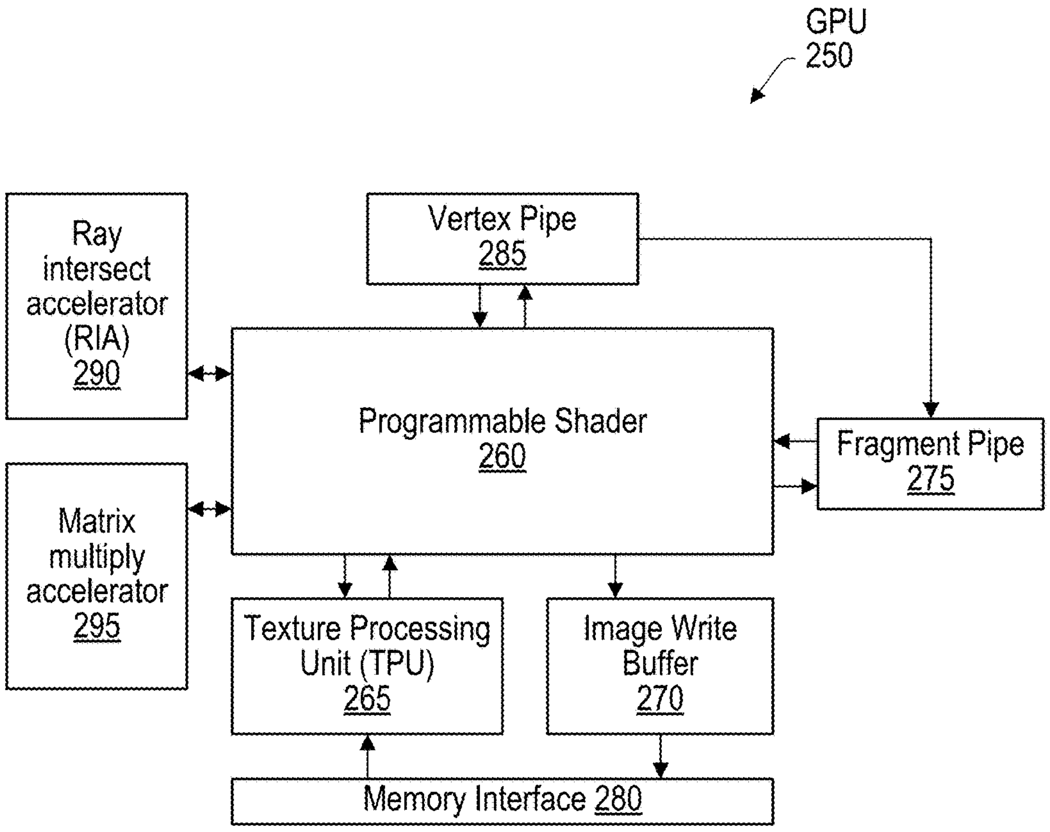
FIG. 2B is a block diagram of one embodiment of a graphics processing unit.

The paradigm of the present disclosure can be applied to manage power for any suitable processing circuit. One particular circuit of interest is a GPU. GPUs typically excel in parallel processing, and are able to perform various tasks such as those related to machine learning, in addition to its traditional role of converting 3D graphics data from a software application to a 2D representation to be stored in a frame buffer of a display. Processor 130 can thus make power determinations for a GPU (or a cluster of individual GPU cores in some implementations) based on an examination of current power utilization trends. There are many possible ways to implement a graphics pipeline. FIGS. 2A-B provide a short description of some possible GPU implementations.

Graphics Processing Overview

Referring to FIG. 2A, a flow diagram illustrating an example processing flow 200 for processing graphics data is shown. In some embodiments, transform and lighting procedure 210 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 215 may involve discarding polygons or vertices that fall outside of a viewable area. In some embodiments, geometry processing may utilize object shaders and mesh shaders for flexibility and efficient processing prior to rasterization. Rasterize procedure 220 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 230 may involve altering pixel components based on lighting, shadows, bump mapping, translucency, etc. Shaded pixels may be assembled in a frame buffer 235. Modern GPUs typically include programmable shaders that allow customization of shading and other processing procedures by application developers. Thus, in various embodiments, the example elements of FIG. 2A may be performed in various orders, performed in parallel, or omitted. Additional processing procedures may also be implemented.

Referring now to FIG. 2B, a simplified block diagram illustrating a graphics processing unit (GPU) 250 is shown, according to some embodiments. In the illustrated embodiment, GPU 250 includes programmable shader 260, vertex pipe 285, fragment pipe 275, texture processing unit (TPU) 265, image write buffer 270, and memory interface 280. In some embodiments, GPU 250 is configured to process both vertex and fragment data using programmable shader 260, which may be configured to process graphics data in parallel using multiple execution pipelines or instances.

Vertex pipe 285, in the illustrated embodiment, may include various fixed-function hardware configured to process vertex data. Vertex pipe 285 may be configured to communicate with programmable shader 260 in order to coordinate vertex processing. In the illustrated embodiment, vertex pipe 285 is configured to send processed data to fragment pipe 275 or programmable shader 260 for further processing.

Fragment pipe 275, in the illustrated embodiment, may include various fixed-function hardware configured to process pixel data. Fragment pipe 275 may be configured to communicate with programmable shader 260 in order to coordinate fragment processing. Fragment pipe 275 may be configured to perform rasterization on polygons from vertex pipe 285 or programmable shader 260 to generate fragment data. Vertex pipe 285 and fragment pipe 275 may be coupled to memory interface 280 (coupling not shown) in order to access graphics data.

Programmable shader 260, in the illustrated embodiment, is configured to receive vertex data from vertex pipe 285 and fragment data from fragment pipe 275 and TPU 265. Programmable shader 260 may be configured to perform vertex processing tasks on vertex data which may include various transformations and adjustments of vertex data. Programmable shader 260, in the illustrated embodiment, is also configured to perform fragment processing tasks on pixel data such as texturing and shading, for example. Programmable shader 260 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 260 are included in a GPU. In these embodiments, global control circuitry may assign work to the different sub-portions of the GPU which may in turn assign work to shader cores to be processed by shader pipelines.

TPU 265, in the illustrated embodiment, is configured to schedule fragment processing tasks from programmable shader 260. In some embodiments, TPU 265 is configured to pre-fetch texture data and assign initial colors to fragments for further processing by programmable shader 260 (e.g., via memory interface 280). TPU 265 may be configured to provide fragment components in normalized integer formats or floating-point formats, for example. In some embodiments, TPU 265 is configured to provide fragments in groups of four (a "fragment quad") in a 2×2 format to be processed by a group of four execution pipelines in programmable shader 260.

Image write buffer 270, in some embodiments, is configured to store processed tiles of an image and may perform operations to a rendered image before it is transferred for display or to memory for storage. In some embodiments, GPU 250 is configured to perform tile-based deferred rendering (TBDR). In tile-based rendering, different portions of the screen space (e.g., squares or rectangles of pixels) may be processed separately. Memory interface 280 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, GPU 250 includes ray intersection accelerator (RIA) 290, which may include hardware configured to perform various ray intersection operations in response to instruction(s) executed by programmable shader 260, as described in detail below.

In the illustrated example, GPU 250 includes matrix multiply accelerator 295, which may include hardware configured to perform various matrix multiply operations in response to instruction(s) executed by programmable shader 260, as described in detail below.

Performance Counter Aggregation

Figure 3A:
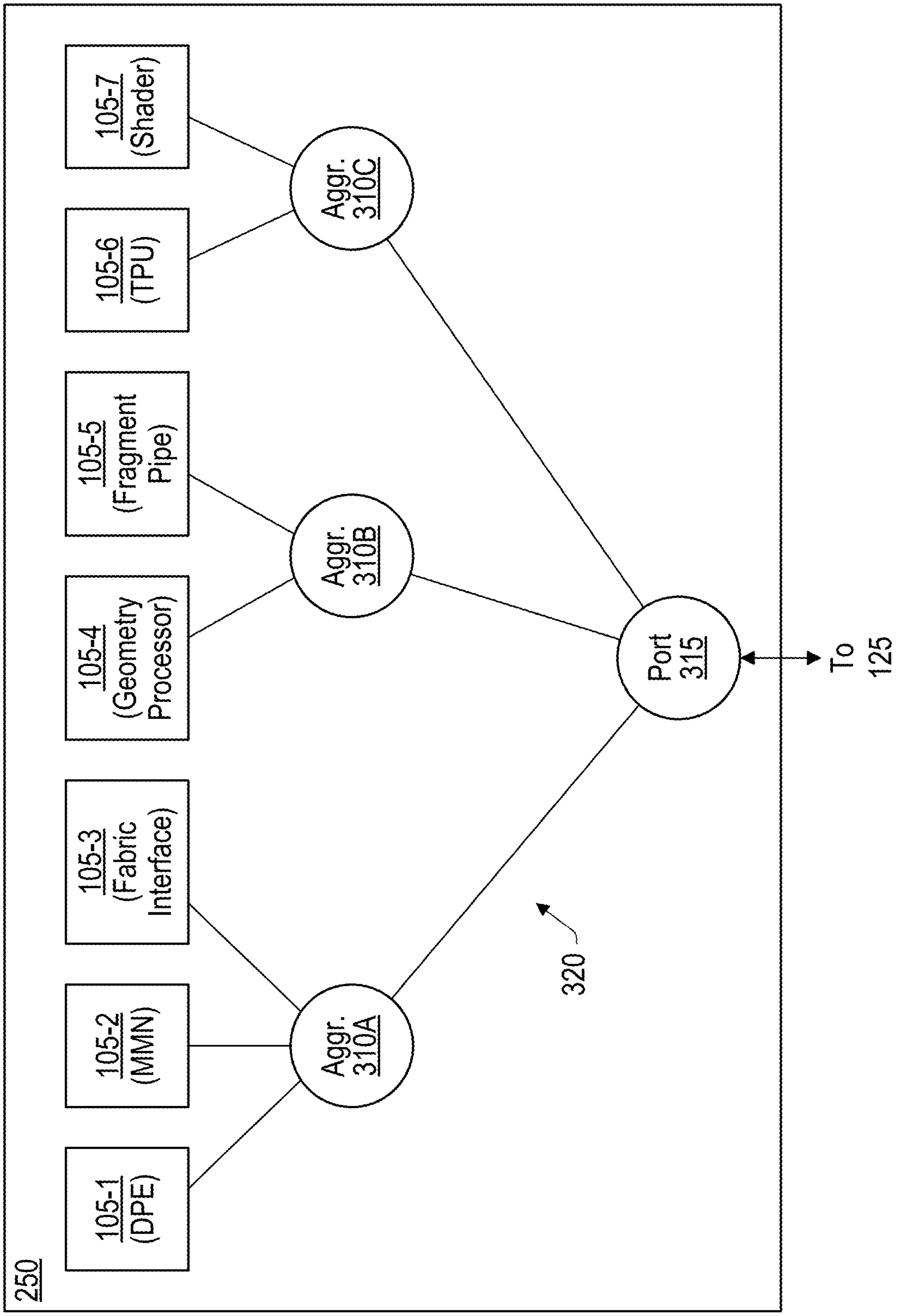
FIG. 3A is a block diagram that illustrates performance counter aggregation within the context of one embodiment of a graphics processing unit.

FIG. 3A is a block diagram that illustrates performance counter aggregation within the context of one embodiment of a graphics processing unit. As previously explained, GPU 250 includes different engines and sub-block circuits that perform various functions, including those within the graphics pipeline. Various sets of performance counters 105 for different sub-block circuits of GPU 250 are shown, including 105-1 for a digital power estimation (DPE) block, 105-2 for a memory management unit (MMU) for graphics memory that may be accessible via memory interface 280, 105-3 for the interface to the fabric of the computer system that includes GPU 250, 105-4 for a geometry processor (not explicitly depicted within FIG. 2B), 105-5 for fragment pipe 275, 105-6 for texture processing unit 265, and 105-7 for programmable shader 260. GPU 250 also includes a register interface bus 320 that includes aggregation points 310A-C and 315. Aggregation point 315 is accessible (e.g., by limiter engine 120) via register interface 125.

There may be many more instances of performance counters 105 within an actual implementation of GPU 250 that those depicted here. Additionally, there may be multiple instances of GPU 250—some platforms might have as many as 80 GPU instantiations. Accordingly, a mechanism is needed for efficiently aggregating all the distributed per-instance performance counter data for a range of possible designs. Register interface (RIF) bus 320 can be used for this purpose, as it is generally usable to access a wide range of registers within GPU 250, of which the performance control registers are a subset.

As shown, RIF bus 320 includes aggregation points 310 and 315, which allows the contents of performance counters 105 to be periodically aggregated. Such aggregation may occur in response to a broadcast read initiated by limiter engine 120. The broadcast read may be directed to a set of pre-programmed addresses that specify the desired performance control registers 105. As will be described further below, in one implementation, RIF bus 320 may be configured to compute the sum, min, and max of the performance counters 105 that are addressed through the broadcast read.

Generalized View of Register Aggregation

Figure 3B:
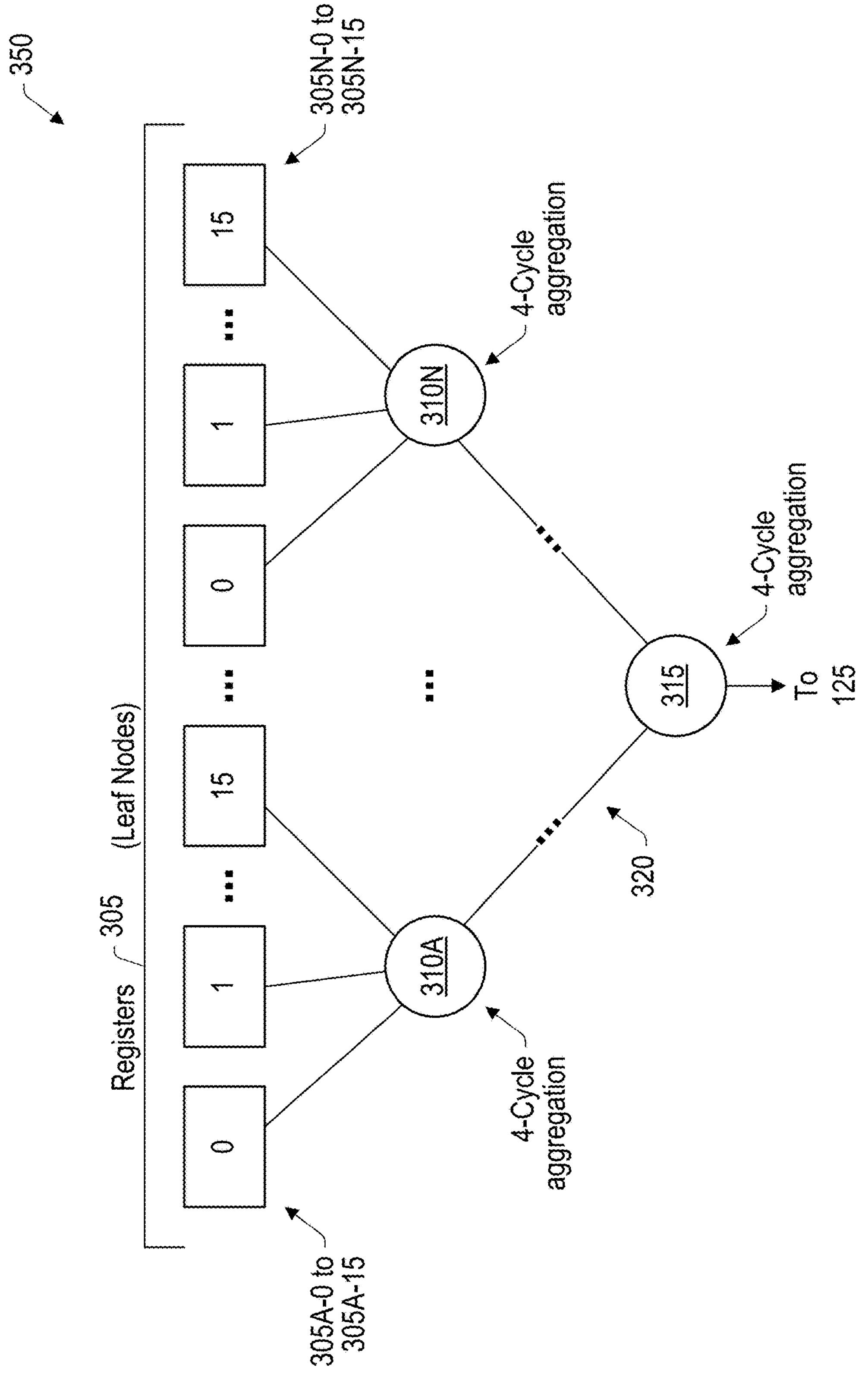
FIG. 3B is a block diagram that illustrates a generalized view of register aggregation within a processing circuit 350 that includes RIF bus 320.

FIG. 3B is a block diagram that illustrates a generalized view of register aggregation within a processing circuit 350 that includes RIF bus 320. The depicted design includes a hierarchy in which registers 305 (which can be performance counters 105 in one embodiment) are leaf nodes at a lowest level of the hierarchy and aggregators 310 and 315 are present at higher levels. In the depicted design, a given aggregator 310/315 can service up to 16 leaf nodes and act as distributed processing elements. Aggregator 310A, for example, can service leaf nodes 305A-0 to 305A-15, while aggregator 310N can service leaf nodes 305N-0 to 305N-15. A top-most level of the hierarchy will complete the aggregation process.

In the depicted embodiment, each sampling of registers 305 involves an aggregation process that occurs over a number of cycles. In the depicted embodiment, the aggregation from one level to a next-higher level occurs over four cycles. In this arrangement, an N-level network, where N is an integer greater than or equal to 2, will be able to perform an accumulation over (N−1)+4 cycles. Accordingly, a three-level network can perform an aggregation in six cycles.

As used herein, an "aggregation" of register values refers to performing one or more types of mathematical and/or logical operations on register value. In one embodiment, an aggregator might simply sum all register values in its constituent leaf nodes (and thus output a single value). But an aggregation operation can perform more than one result in some cases. The implementation discussed with respect to the next figure, for example, performs sum, min, and max operations. Accordingly, the aggregator 315 is configured to output three separate values to interface 125 for each sampling period.

Multi-Cycle Aggregation

Figure 3C:
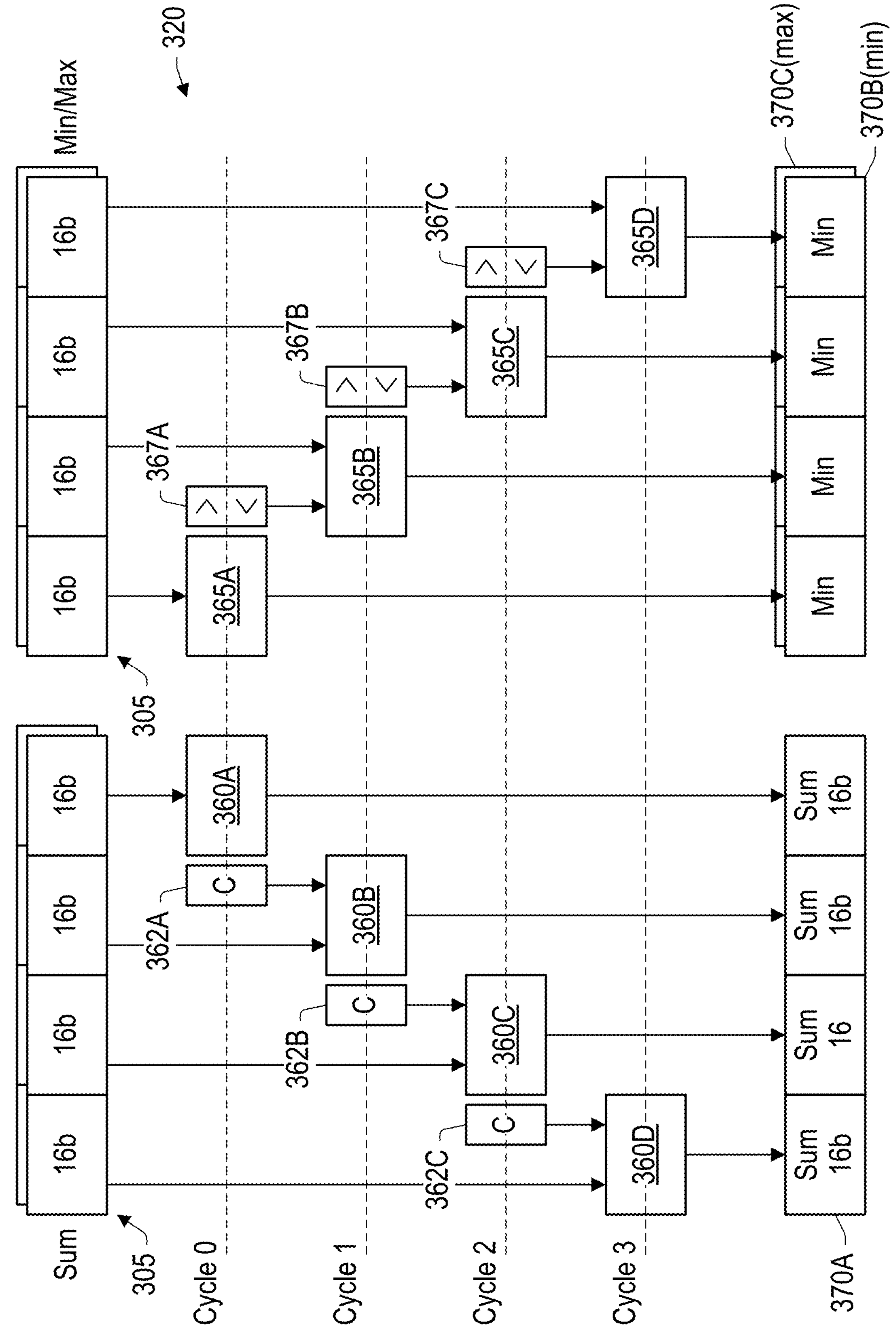
FIG. 3C is a block diagram illustrating a sample aggregation operation for a set of registers 305 within a RIF bus 320.

FIG. 3C is a block diagram illustrating a sample aggregation operation for a set of registers 305 within a RIF bus 320. Although the particulars may vary in different implementations, the depicted embodiment includes 64 bits per leaf node in a particular one of registers 305 at level L, and a four-cycle process that aggregates results to level L+1 by operating on groups of 16 bits per cycle. In this embodiment, three separate operations are performed in each aggregation: sum, max, and min. For clarity, the left side of FIG. 3C indicates the sequencing of the sum operation for a particular register, while the right side of the Figure shows the sequencing of the min and max operations.

The sum operation is implemented by a set of 16-bit adders 360 and corresponding carry circuits 362. The sum operation starts with adder 360A, which is configured to receive the least-significant 16-bit words for all leaf nodes at level L. This set of 16-bit values is added in cycle 0 and a set of carry-out bits is computed by carry circuit 362A and saved for the subsequent add. The output of adder 360A is stored in the least-significant portion of output register 370A. This process repeats in cycle 1 with adder 360B and carry circuit 362B, and in cycle 2 with adder 360C and carry circuit 360C (with outputs of adders 360B-C also stored in output register 370A. Finally, in cycle 3, adder 360D and the output of carry circuit 360C determine the most-significant 16-bit portion of the sum, storing the result in the most-significant portion of output register 370A. If level L+1 is not the top level, the resulting value stored in register 370A can be forwarded to the next aggregator at level L+2. This approach allows RIF 320 to compute the sum of all registers in a timely fashion.

For max and min operations, the order is reversed relative to the add operation, proceeding from most-significant to least-significant portions of the registers being accumulated. As shown, the most-significant 16 bits of each are compared by comparator 365A in cycle 0, with a winner mask for max and min results being determined across all leaf cells by mask circuit 367A. For example, if leaf cells are denoted in the mask from 15 to 0, a winner mask for the max operation of 0010 0000 0000 0000 would indicate that leaf cell 13 is the max value across all other accumulated leaf cells. (A similar winner mask may be generated for the min operation.) The min and max for the most-significant 16 bits are then written to the upper portions of output registers 370B and 370C, respectively.

The winner mask may also indicate that there is a tie; for example, a winner mask of 0010 0001 0010 0000 would indicate that leaf cells 13, 8, and 5 all have the same value for the most-significant 16 bits. Accordingly, in cycle 1, only the next most-significant 16 bits need be compared by comparator 365B in order to determine the max value (a similar process occurs for the min value). The process continues in cycles 2 and 3 with comparators 365C-D and mask circuit 365C. Thus, at the conclusion of cycle 3, output registers 370B and 370C store min and max values across all leaf cells at level L. The process illustrated in FIG. 3C can repeat as needed at each successive level until sum, min, and max have been computed across all registers in a processing circuit.

In the case of portions of a processing circuit that have been harvested (i.e., purposely excluded from a particular integrated circuit as part of a manufacturing decision) or otherwise disabled, the relevant portion can provide an additional status bit to allow the aggregation nodes to distinguish between a block reporting all zeros (the default for a disabled block) and a block that has been harvested.

Cswitch Histogram and Trace

As described above, one data point that may be relevant to making performance decisions is average processor utilization for an entire processing circuit over some sampling period (e.g., a frame in the context of a GPU). As noted, it is recognized that the use of more granular information about utilization can be used to make more optimal power management decisions. Two such types of information which the present disclosure proposes to use are a utilization histogram and a utilization trace.

Figure 4A:
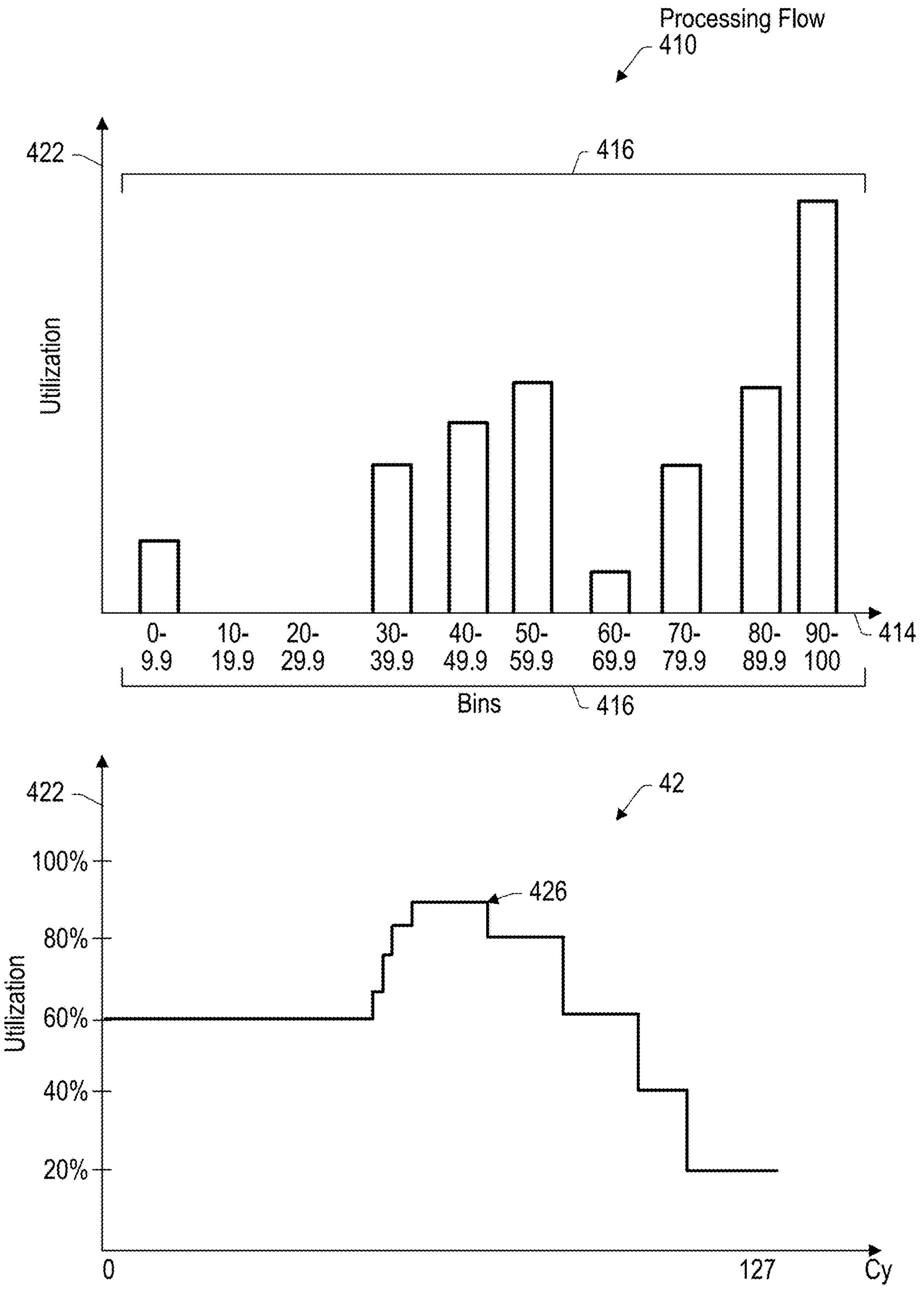
FIG. 4A is a diagram illustrating sample output of a Cswitch histogram and trace according to one embodiment.

FIG. 4A is a diagram illustrating a sample Cswitch histogram 410 and Cswitch trace 420 according to one embodiment. As depicted, histogram 410 has two axes. X-axis 414 specifies a number of bins 416 that define ranges of utilization percentages over the sampling period (e.g., an entire graphics frame). Y-axis 412, on the other hand, specifies a number of samples counted for each bin during the sampling period. The collective sizes for each of the bins (indicated by reference numeral 418) thus forms a frequency-domain representation of processor utilization during the sampling period.

Trace 420, on the other hand, is a time-domain representation of processor utilization during the sampling period. X-axis 424 represents time, with 128 samples (0-127) during the sampling period. Y-axis 422 represents processor utilization. Histogram 420 can thus be used to show how processor utilization changes over time (as indicated by reference numeral 426). The time- and frequency-domain distributions depicted in FIG. 4A can be used to make more intelligent power management decisions than is possible with average processor utilization alone, as will be discussed further with respect to FIG. 4C.

Figure 4B:
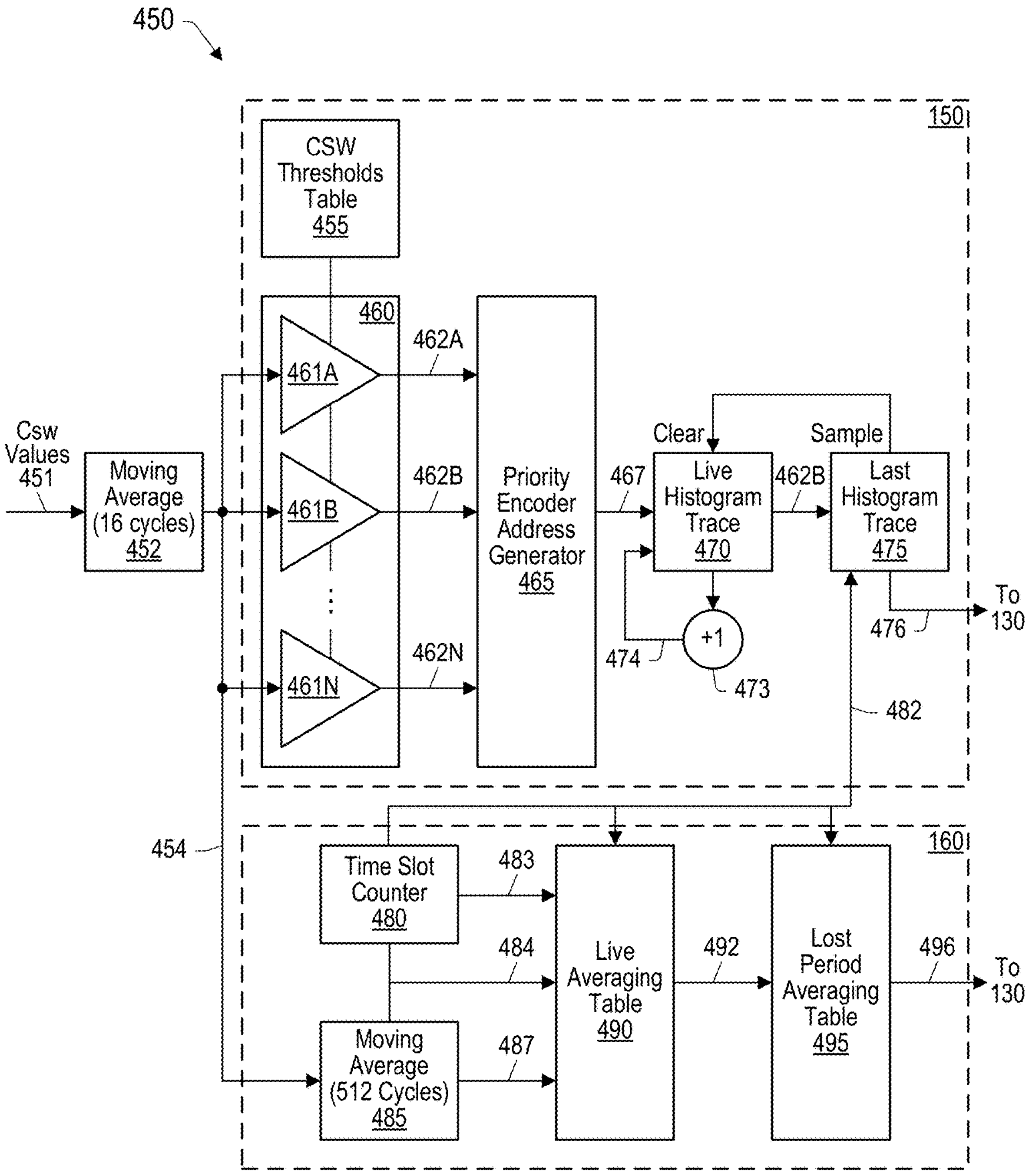
FIG. 4B is a block diagram of one embodiment of a circuit for storing a representation of a histogram and a trace for processor utilization during a sampling period.

FIG. 4B is a block diagram of one embodiment of a circuit 450 for storing a representation of histogram 410 and trace 420. As shown, circuit 450 includes a histogram circuit 150 and a trace circuit 160 that are interconnected. In other embodiments, circuits 150 and 160 may be implemented independently of one another.

Moving average circuit 452 is configured to compute a moving average value 454 that is indicative of processor utilization. Circuit 452 may receive several aggregations of Csw values 451 from RIF bus 320, and perform a divide (shift) operation to generate an average (over 16 cycles in the depicted embodiment). Circuit 452 can thus be considered to be a de-noiser circuit to eliminate transient issues caused by a few irregular samples.

Moving average value 454 is then provided to programmable comparator circuit 460, which includes a set of comparators 461A-N. Through the use of Csw thresholds table 455, comparators 461 can each be programmed to define bins for the histogram, such as bins 416 depicted in FIG. 4A. The operation of circuit 460 may be set up in various ways. In one implementation, comparators 461 can each be set to define an upper range for the bins. In the context of the bin arrangement depicted in FIG. 4A, for example, comparator 461A may be set to have an upper boundary of 9.9%, comparator 461B is set to 19.9%, and so on. When a given moving average value 454 is presented concurrently to comparators 461, a given comparator will generate a comparison signal 462 that indicates whether its programmed upper limit is greater than or value 454. Thus, if value 454 is equivalent to 54% utilization, comparators 461 will generate a logic 1 value (greater than) for bins with the upper limits 59.9%, 69.9%, 79.9%, 89.9%, and 100%. Conversely, comparators 461 will generate a logic 0 value for bins with upper limits 9.9%, 19.9%, 29.9%, 39.9%, and 49.9%. One of skill in the art will appreciate that various alternatives to this comparison scheme are readily apparent.

Priority encoder address generator circuit 465 is configured in one embodiment to pick the bin with the lowest upper limit that is greater than the current sample. In the example above, the bin for 54% utilization will thus be the bin with an upper limit of 59.9% (50%->59.9% bin). Accordingly, circuit 465 outputs selection 467 that is indicative of the bin into which value 454 is placed. When there are between 9-16 bins, for example, selection 467 may be encoded using a 4-bit value.

Live histogram trace circuit 470 stores a current version of the histogram being computed for the current sampling period. When a new value of selection 467 is presented to circuit 470, the contents of the selected bin are output as addend 471 to incrementer 473, which is configured to output a sum 474 that is written back to the selected bin. Thus, if the current value of a particular bin is 9 and selection 467 indicates that bin, the value 9 will be output as addend 471, and incrementer 473 will output the value 10 as sum 474 that is then written back to circuit 470. This process of incrementing bins in circuit 470 will continue throughout the current sampling period.

In one embodiment, time slot counter circuit 480 will initiate signal 482 to cause last histogram trace circuit 475 to sample live histogram trace circuit 470 and cause its contents to be written to last histogram trace circuit 475 (via signals 472 and 478, respectively). The use of circuits 470 and 475 allows circuit 475 to afford entities such as power manager processor 130 static access to the histogram data. When live histogram trace circuit 470 is sampled, it will also be cleared in the same cycle in one implementation. The use of circuits 470 and 475, which act as ping-pong buffers, repeats throughout operation of circuit 450. In systems with multiple processing circuits, the information stored in live histogram trace circuit 470 can be configured to store information for a single processing circuit or the total of all these circuits, as desired.

Trace circuit 160 also receives, at moving average circuit 485, moving average value 454. In the depicted embodiment, moving average value 454 represents a 16-cycle average, and moving average circuit 485 is configured to store a 512-cycle average. Accordingly, once moving average circuit 485 collects sufficient data to compute a 512-cycle average, this average (which is indicated by reference numeral 487) is written to live averaging table 490 as a single sample. In the depicted embodiments, table 490 is configured to store up to 128 samples at a time (time slot counter can clear circuit 485 via signal 484 as needed). Accordingly, table 490 stores 128×512 cycles worth of time-domain data describing the variation of processor utilization. Similar to the organization of histogram circuit 150, trace circuit 160 maintains a copy of its table. Time slot counter 480 is configured to periodically cause, via signal 482, live averaging table 490 to be written, via bus 492, to last period averaging table 495 while clearing table 490 so the process can repeat. Last period averaging table 495 thus provides static access for the utilization trace data to power management processor 130 while table 490 is collecting new trace information. Tables 490 and 495 also act as ping-pong buffers.

Time slot counter circuit 480 is configured to vary the number of samples it accumulates for circuits 150 and 160 depending on the current P-state frequency in order to keep a relatively constant sample time (e.g., ~260 μsec (or 1/32nd of a graphics frame).

Figure 4C:
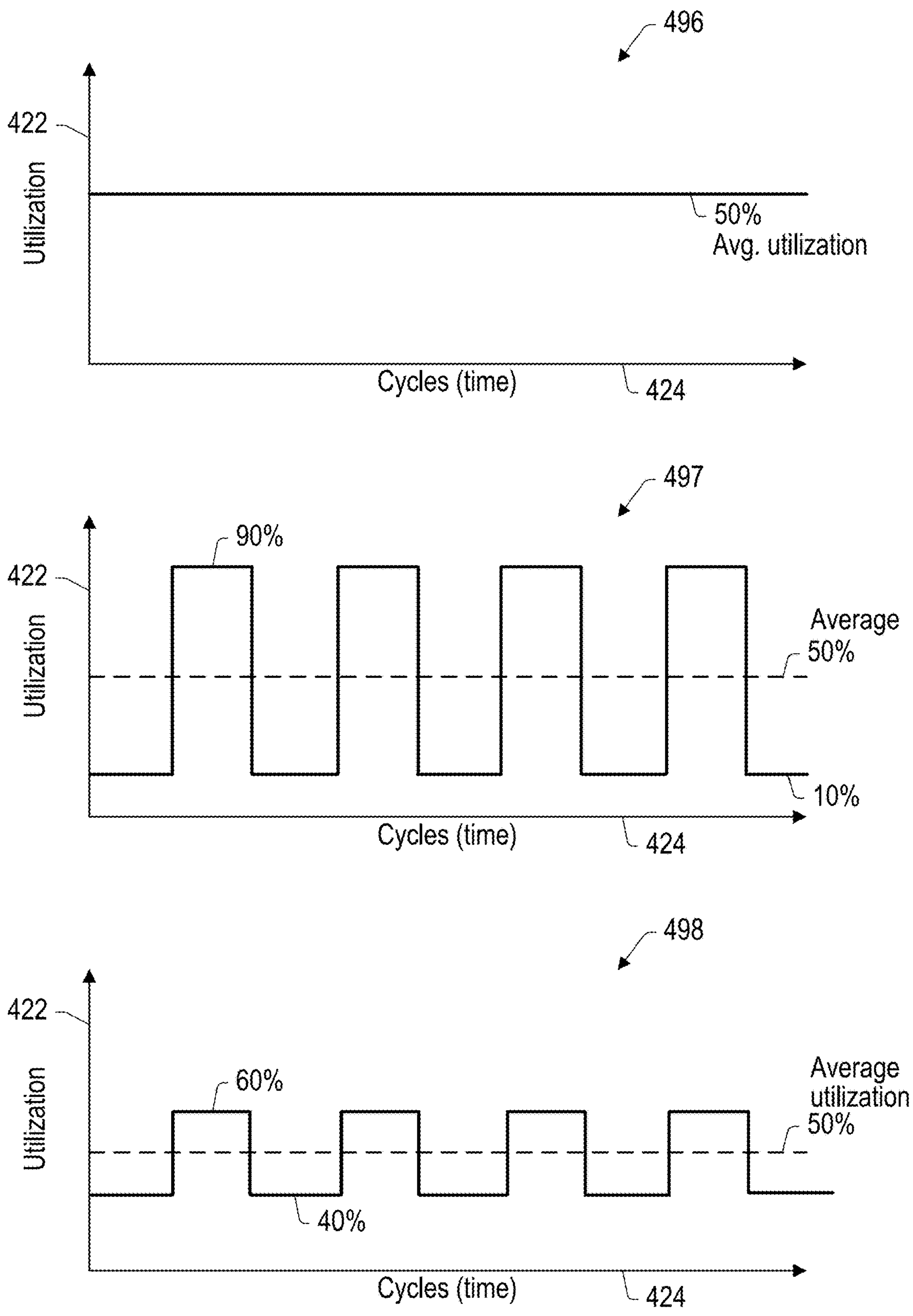
FIG. 4C depicts three different time-versus-utilization graphs.

FIG. 4C depicts three different time-versus-utilization graphs that can illustrate the additional type of information that Cswitch trace circuit 160 can provide. As shown three different graphs with time (cycles) on x-axis 424 and utilization on y-axis 422 are shown for a single graphics frame. Graph 496 has a constant 50% utilization throughout the frame. Graphs 497 and 498 also have a 50% average utilization, but graph 497 alternates between 90% and 10% utilization, while graph 498 alternates between 60% and 40%. Cswitch trace circuit 160 stores the information represented in these graphs. Cswitch histogram circuit 150 stores similar information, but in a frequency-domain format.

In prior implementations, the average power consumption of a processing circuit was known over some time period (e.g., during a frame in the context of a GPU). Armed only with this information, a power management processor could read the power consumption, make a comparison to some metric that relates to temperature, make a determination whether the system is too hot or cold, and then adjust its p-state accordingly. Such an approach, however, does not take into account how utilization progressed during the sampling period; it just provides an average at the end.

In certain embodiments, the power management processor may employ a technique known as p-state dithering. Power management processor 130 might make a determination that the optimal frequency to run the GPU at is 800 megahertz. But suppose that the available p-states allow running at 700 MHz or 900 MHz, but not 800 MHZ. Accordingly, the power management processor can split time at 700 MHz and 900 MHz in an attempt to achieve an average of 800 MHz. In prior GPU implementations, this mix of times between the two p-states is, in effect, done blindly since there is no visibility into what is going on during the course of the frame.

But Cswitch trace circuit 160 provides more insight into what is occurring within the frame. Processor 130 can thus determine, for example, that the GPU can be run at a lower frequency during those portions of the frame in which the GPU is underutilized, while running the GPU at a higher frequency during those portions of the frame in which the GPU is more heavily utilized. Circuit 160 thus provides more granular data to power management processor 130.

Consider an example in which a GPU is severely limited by memory bandwidth, and the Cswitch is very low during the whole period. A read of histogram circuit 150 will reveal that most of the Cswitch entries occur in the lower range of the 0 to 50% bins; the values for bins in the 50% to 100% range are 0. Processor 130 would then know not only that the average usage for the frame thing was low, but the distribution of the usage was fairly uniform. As graphs 496, 497, and 498 illustrate, the same average utilization over a frame can have very different time distributions. For example, if the data in Cswitch trace circuit 160 indicates that utilization was low throughout a frame, it would be safe to bring the p-state down because no samples would suffer from dropping the frequency. Trace circuit 160 thus allows processor 130 to know when to take certain actions during a frame.

This information is useful because GPUs tend to work in patterns. For example, at the beginning of a cycle, geometry processing at may occur, which is relatively low utilization. This may be followed by high-Cswitch math processing. Subsequently, writes to the display occur. Cswitch trace circuit 160 thus gives processor 130 a more complete picture of what is occurring within a frame or other period of time.

Limiter Trace

As has been described, Cswitch histogram circuit 150 and Cswitch trace circuit 160 store aggregated Cswitch values. That is, these circuits store frequency-domain and time-domain utilization values for processing circuit 110 as a whole during some time period such as the duration of a graphics frame. Limiter trace circuit 170, on the other hand, includes information relating to Cswitch values for individual sub-blocks within processing circuit 110.

Figure 5A:
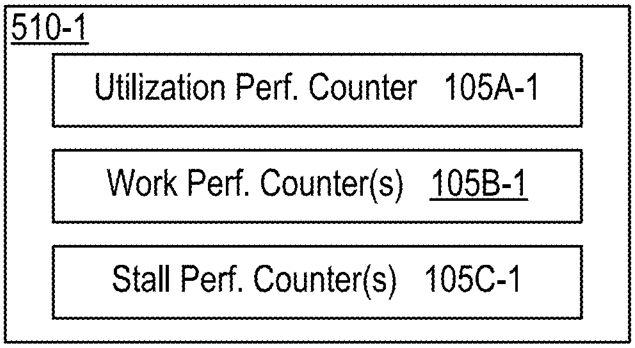
FIG. 5A is a block diagram of one embodiments of performance counters that may be stored in a sub-block circuit of a larger processing circuit.

To understand the contents of limiter trace circuit 170, it is first instructive to consider the potential contents of sub-blocks within one embodiment of processing circuit 110, which is depicted in FIG. 5A. This figure depicts an embodiment of a single sub-block circuit 510-1, which may be one of numerous sub-blocks within processing circuit 110. In one implementation, sub-block circuit 510-1 might be one of 30-40 (or more) different sub-block circuits within processing circuit 110. Sub-block circuit 510-1 might, for example, implement programmable shader 260 or other circuit shown in FIG. 2B in one embodiment; in another embodiment, sub-block circuit 510-1 might implement a portion of programmable shader 260 or some other circuit.

As shown, sub-block circuit 510-1 includes, in the depicted embodiment, three types of performance counters 105: utilization performance counter 105A-1, work performance counter 105B-1, and stall performance counter 105C-1. Accordingly, various sub-block circuits 510 may have one or all these different types of performance counters 105 (or other types of performance counters not explicitly disclosed here). Utilization performance counter 105A-1 stores a value indicative of Cswitch utilization for sub-block 510-1, and thus corresponds to the performance counters discussed above with respect to FIG. 1, for example. Work performance counter 105B-1 and stall performance counter 105C-1 store values indicative of the amount of work (e.g., a number of completed operations) and stalls (e.g., the number of clock cycles during which processing was blocked) in a particular sub-block circuit, and are used to determine which sub-block circuits 510 of processing circuit 110 act as the hardware limiters of processing circuit 110, as will be described next.

Figure 5B:
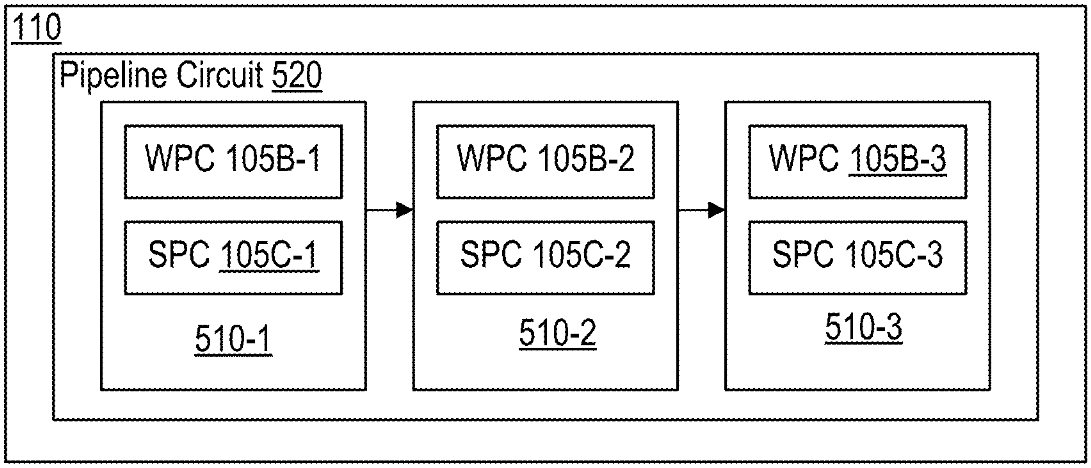
FIG. 5B is a block diagram of one embodiment of performance counters within an execution pipeline of a processing circuit.

FIG. 5B depicts one embodiment of a processing circuit that includes a pipeline circuit 520 that includes multiple sub-block circuits 510, each with its own set of work and stall performance counters. In the depicted embodiment, pipeline circuit 520 includes sub-block circuits 510-1, 510-2, and 510-3. Circuit 510-1 is immediately upstream from circuit 510-2, and thus is responsible for supplying work to circuit 510-2. Circuit 510-2 can also be said to be immediately downstream from circuit 510-1 and is thus responsible for handling work sent to it by circuit 510-1. Similarly, circuit 510-2 is immediately upstream from circuit 510-3, and thus is responsible for supplying work to circuit 510-3. Circuit 510-3 is immediately downstream from circuit 510-2 and is thus responsible for handling work sent to it by circuit 510-2.

While performance counters 105A (not shown in FIG. 5B) indicate how busy a particular sub-block circuit 510 is, work performance counters 105B and stall performance counters 105C indicate how much work a particular sub-block 510 is performing (and conversely, how much stalling is occurring for that sub-block). Collectively, this information can be used to determine which sub-block (or sub-blocks) with pipeline circuit 520 are the limiting factor(s) (i.e., the "hardware limiter"). Stated another way, a sub-block 510 that is acting as a hardware limiter has 100 percent sensitivity to frequency. For example, consider an ALU-based workload that is doing a lot of mathematical computations within an GPU. In that case, a sub-block such as a shader circuit may be the hardware limiter because for every frequency reduction on that sub-block, there will be a corresponding reduction in performance. Note that different types of workloads can result in different types of sub-blocks being limiters.

Consider a scenario in which sub-block 510-2 has taken 100 cycles to process a single work item, resulting in upstream sub-block 510-1 stalling from sending additional work for 99 cycles and downstream sub-block 510-3 stalling from receiving additional work for 99 cycles. Utilization performance counters 105A can show how busy individual sub-blocks are, but through use of performance counters 105B-C, as well as a knowledge of the relationship between different sub-blocks, the hardware limiter can be identified. For example, a determination by power management processor 130 that sub-blocks 510-1 and 510-3 are mostly stalling at a given point in time while sub-block 510-2 is doing a high degree of work can help identify that sub-block 510-2 is the hardware limiter. As will be described later, power management processor 130 may store (or have access to) code that implements various formulas that utilize current values of various performance counters 105 to determine which sub-block 510 is the current hardware limiter. Note that formulas for determining a hardware limiter are not restricted to an analysis of a single pipeline circuit. A determination of hardware limiters can be arbitrarily complex, as needed for a particular integrated circuit design.

Consider a scenario in which most sub-blocks in a GPU have less than a 50% utilization, but the memory interface sub-block is at 100% utilization. In that case, power management processor 130 might take two different paths-request more memory bandwidth from the overall system (e.g., the SoC) or reduce the GPU's p-state. In this situation, the GPU sub-blocks are using only every other clock, meaning that sensitivity to frequency is 50%. In such a situation, in theory, the GPU could be run at 50% of its current frequency and achieve the same performance. A power management decision in a previous implementation might decide to increase the p-state in view of available information—for example taking GPU frequency from 1 GHz to 1.2 GHZ. But this decision might result in dropping most GPU sub-blocks from 50% utilization to 40%. Instead, power management processor 130, armed with information relating to the utilization of individual sub-blocks and their sensitivity to frequency, can make more intelligent decisions about p-state changes. Hardware limiter information is thus another example of the advantages providing more granular information to power management processor 130.

Figure 5C:
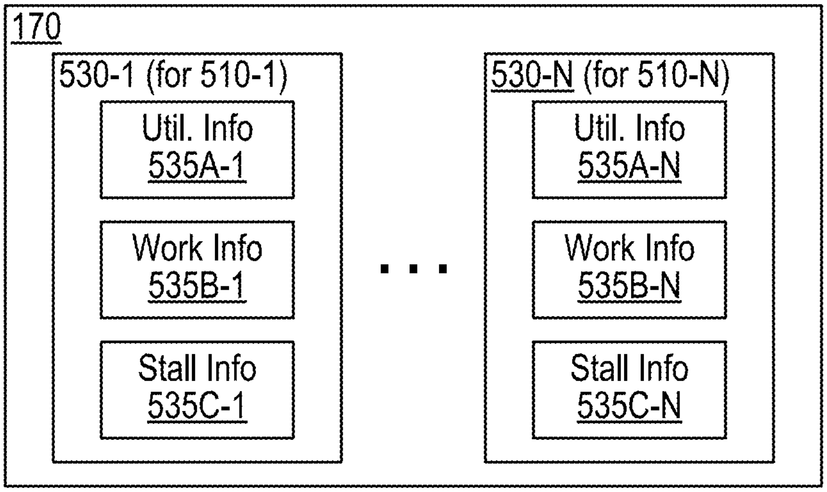
FIG. 5C is a block diagram of one embodiment of a limiter trace circuit.

FIG. 5C illustrates a block diagram of one embodiment of limiter trace circuit 170. As described above, various sub-blocks 510 throughout processing circuit 110 include various performance counters 105, including utilization performance counters 105A, work performance counters 105B, and stall performance counters 105C. Unlike Cswitch histogram circuit 150 and Cswitch trace circuit 160, which store results from aggregation of performance counter values, limiter trace circuit 170 can store individual (i.e., non-aggregated) performance counter values for sub-block circuits 510.

Limiter trace circuit 170 in FIG. 5C depicts this arrangement. As shown, circuit 170 includes a set of trace buffers 530. Although a variety of storage paradigms could be used, in this embodiment, each sub-block circuit 510 in processing circuit 110 has a different set of trace buffers in circuit 170. Accordingly, if processing circuit 110 has N sub-block circuits 510, there are N trace buffers 530. For example, trace buffer 530-1 stores individual performance counter values for sub-block circuit 510-1, while trace buffer 530-N stores individual performance counter values for sub-block circuit 530-N. A given trace buffer 530 can store whatever relevant set of performance counters are needed to make hardware limiter computations. In the depicted embodiment, a given trace buffer 530 stores values from a utilization performance counter 105A in utilization information buffer 535A, values from work performance counters 105B in work information buffer 535B, and values from stall performance counters in stall information buffer 535C. In one embodiment, these values can be read from sub-block circuits 510 using register interface bus 320 operating in a non-aggregation mode, meaning that individual performance counter values 105 are communicated to trace buffers 530 in limiter trace circuit 170 rather than aggregated values such as those that are stored in Cswitch histogram circuit 150 and Cswitch trace circuit 160. Note that buffers 535 can store a series of performance counter values that are read throughout a sampling period (e.g., for a graphics frame). Thus, a buffer such as 535A-1 might store many different performance counter values over the course of a sampling period.

Figure 5D:
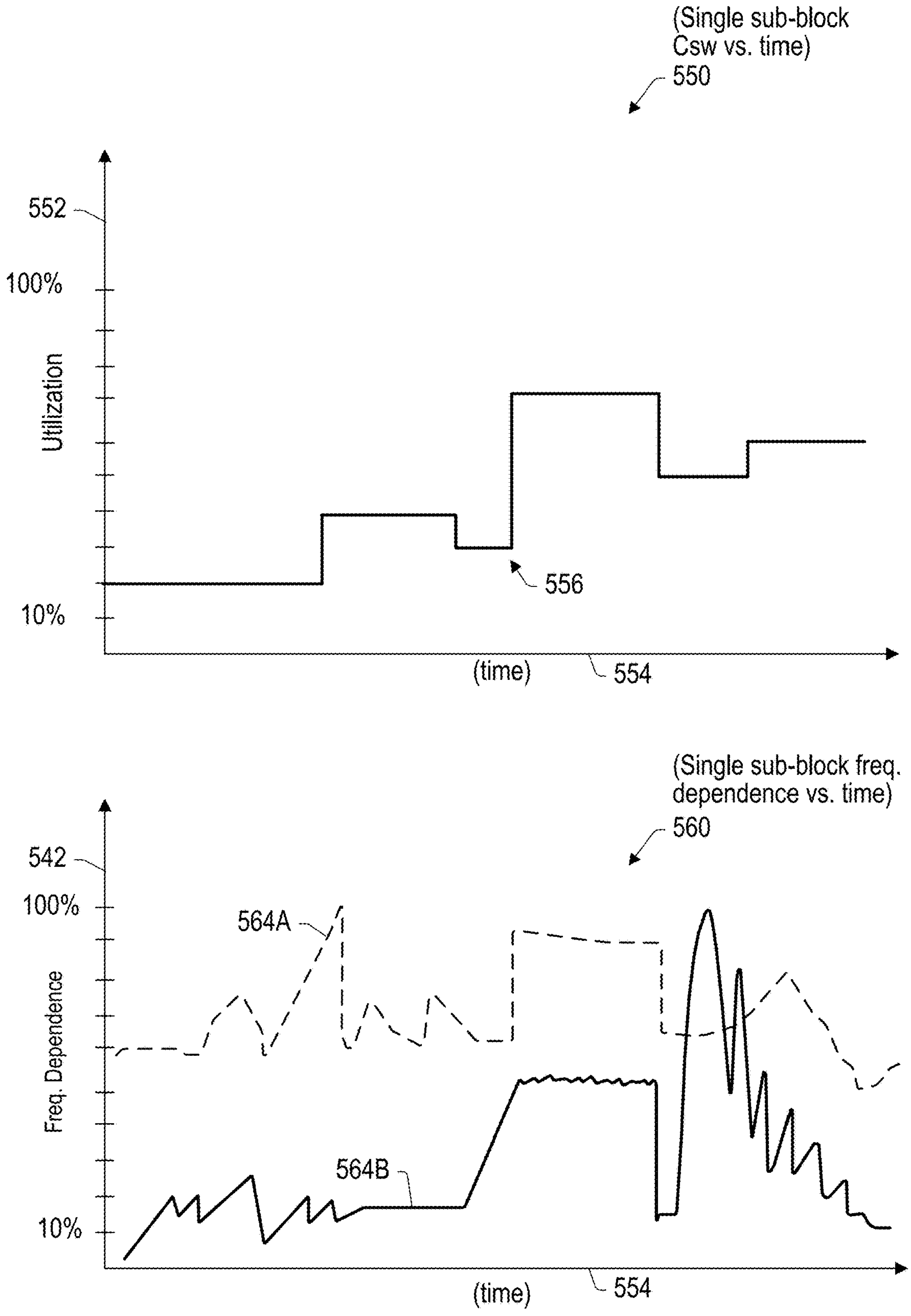
FIG. 5D is an example illustrating two different types of graphs that can be produced from information stored in one embodiment of a limiter trace circuit.

The information stored in limiter trace circuit 170 allows power management processor 130 to make various computations that inform p-state determinations. Two graphs representing different types of information are shown in FIG. 5D. First, graph 550 is an example of utilization for a single sub-block circuit 510. Utilization corresponds to y-axis 552, while time corresponds to x-axis 554. A utilization trace 556 for a particular circuit 510 is shown over a sampling period. Second, graph 560 is an example of frequency dependency for two sub-block circuits 510 versus time. Frequency dependence corresponds to y-axis 542 while time corresponds to x-axis 554. Two frequency dependency traces 564 are shown. It can be seen from the Figure that trace 564B is relatively stable during a portion of the sampling period at approximately 50% dependence, while trace 564A, during the same period, has a frequency dependence above 90%. Power management processor 130 can use this information to determine that the sub-block circuit corresponding to trace 564A is more likely to be the hardware limiter than the sub-block circuit corresponding to trace 564B. It is common for different parts of a GPU to have different frequency dependencies at different points in time, and thus different sub-block circuits can become the hardware limiter over time. Frequency dependency traces 564 thus allow power management processor 130, for example, to determine whether to provide increased frequency to a processing circuit 110 to provide extra performance or whether to drop the frequency to conserve power.

Power Management Processor

Figure 6:
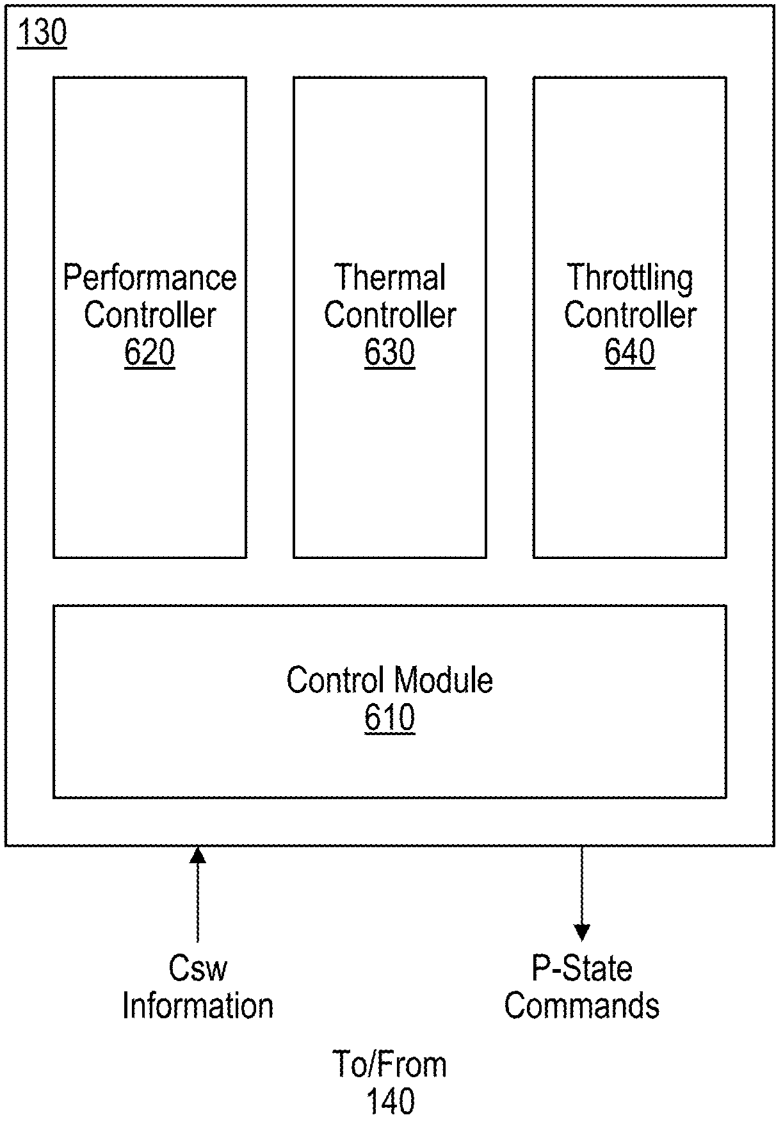
FIG. 6 is a block diagram of one embodiment of a power management processor.

Turning now to FIG. 6, a block diagram of one embodiment of power management processor 130 is shown. Processor 130, in one embodiment, includes various software (e.g., firmware) modules having code that can be executed by a processor to make power management decisions. Processor 130 can receive a variety of types of input data from processing circuit 110, such as Cswitch information, and in turn output information such as p-state commands back to circuit 110. The modules may include performance controller 620, thermal controller 630, and throttling controller 640, as well as a control module 610 that interacts with each of these modules as needed to make final power management decisions.

Performance controller module 620, in one embodiment, includes the code that is used to analyze current performance information stored in circuits such as Cswitch histogram circuit 150, Cswitch trace circuit 160, and limiter trace circuit 170 in order to determine whether a p-state change is warranted. (Note that the modules in this Figure can either represent code that is executed, hardware, or a combination thereof.) P-state determinations are not made in isolation, however. Other factors such as power and current limitations should be considered. These factors may be monitored by thermal controller 630 and throttling controller 640, respectively.

The combination of these various controllers that have access to granular performance information as described above allows processor 130 to make more informed power management decisions. Consider an example in which processing circuit 110 is operating in a high-performance burst mode. One potential approach is to keep increasing p-state towards some maximum operating frequency, and then begin backing off when a thermal limit (e.g., exceeding a power budget) or a current limit is reached. But the present disclosure suggests a more balanced approach in which a decision may be made to not transition to the highest possible p-state in view of potential thermal and current limitations. Processor 130 may determine, for example, that the performance benefit of a p-state increase may be outweighed by potential wasted power from running at a higher p-state and then subsequently having to back off because it would mean exceeding a power budget. In this manner, staying at a balanced point may result in a better performance over a longer period because the integrated circuit die is not heated up as much by running at a relatively high speed. This technique can be especially advantageous when considering memory bandwidth limitations. For example, it might be the case that instead of running at 1V and 1.5 GHZ, the same performance can be achieved by running at 700 MHz and 0.75 V when there are memory bandwidth limitations.

Power management processor 130, in various embodiments, can be configured to run in various different modes. In the GPU context, such optimizations may assume a certain “residency” has been established for frame buffer contents over time. Residency, which can be seen to be common in many GPU workloads, may be established by comparing Csw signatures across multiple periods.

A burst mode may be used when the infrastructure limits of maximum thermals and currents have not been reached. In this mode, the current controllers rely on whether processing circuit has a certain amount of utilization before increasing the p-state. In this mode, understanding the balance between sub-block performance and memory bandwidth will allow processing circuit 110 to avoid pushing to higher p-states when there is not much to gain from it (memory-bound cases) and/or to request more bandwidth if the overall system measure of performance per watts warrants such a request.

When thermal considerations become important during a max thermal mode, processing circuit 110 is given a certain power budget. Power management circuit 130 then translates this budget into a target frequency and dithers between two p-states (that is, spends some portion of a sampling period at a first p-state that is above the target frequency and the remaining portion of the sampling period at a second p-state is below the target frequency). In this scenario, Cswitch histogram circuit 150 provides the Csw distribution and Cswitch trace circuit 160 provides information about where to ideally select the dithered p-state windows to get the highest performance given thermal considerations. Similarly, during a max current mode, power management processor 130 attempts to avoid unnecessary current throttles. Once residency has been established, the goal for processor 130 in this mode is to lower the p-state during the Csw peaks and increase it during the Csw valleys to achieve the best un-throttled performance.

Stated another way, in a burst mode, p-state increases might initially be made in isolation, but at some point, a different mode may be entered in which processing circuit 110 has some fixed power budget that must be considered, and each sub-block circuit 510 is given some portion of that budget. Alternately or in addition, a decision to transition to a higher p-state may be weighed against the probability that a current limit may be reached, which would force a decrease in the p-state.

As noted, performance controller 620 has a variety of information at its disposal. Cswitch histogram circuit 150 provides a frequency-domain view of utilization during the sampling period, while Cswitch trace circuit 160 provides a time-domain view, and limiter trace circuit 170 helps identify bottlenecks such as memory bandwidth limitations. Controller 620 has access to min and max utilizations of processing circuit over the sampling period, in addition to average utilization. Each type of information can have different uses to power management processor 130. Min and max values provide a quick snapshot of utilization, for example. The limiter trace information is helpful, for example in terms of knowing what parts of the engine to speed up or slow down, while the Cswitch trace information is useful is knowing when to speed up or slow down.

Example Method

Figure 7:
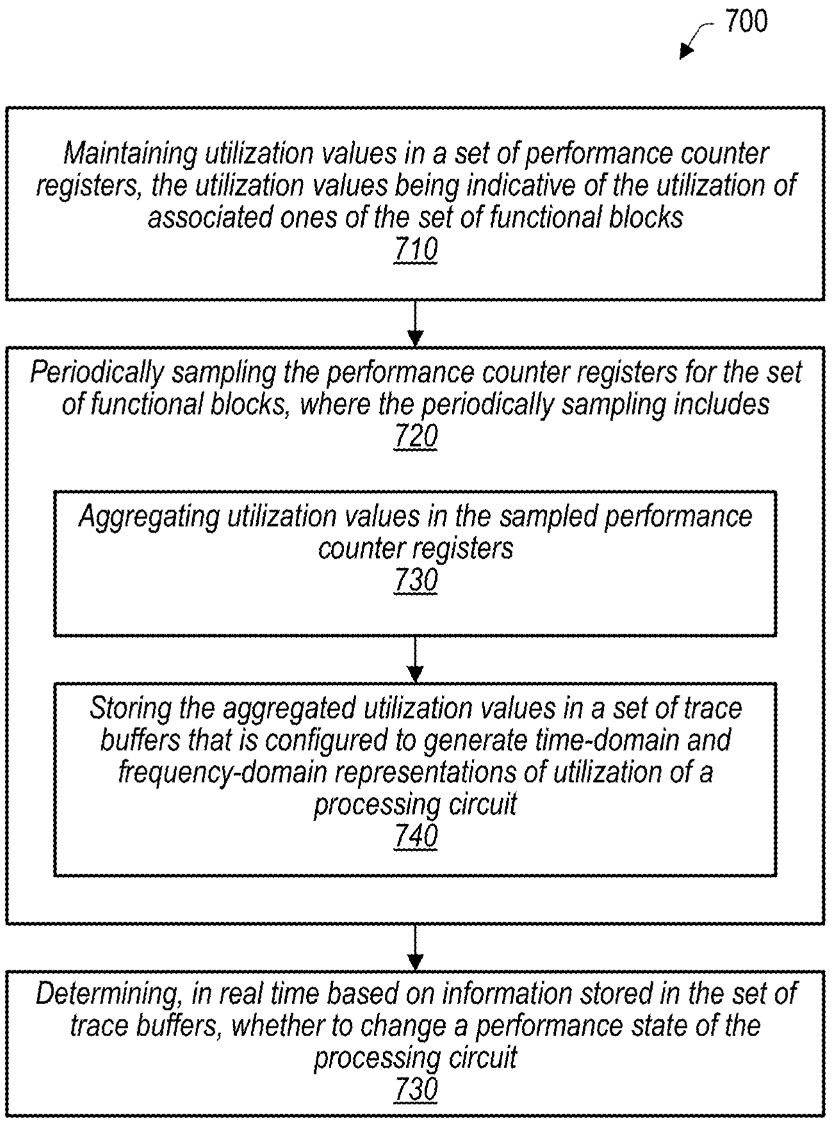
FIG. 7 is a flow diagram of one embodiment of a method for power management of a processing circuit.

FIG. 7 is a flow diagram of one embodiment of a method for power management of a processing circuit. In some implementations, method 700 may be performed by one or more processing circuits. In some embodiments, those processing circuits are GPUs.

Method 700 begins in 710, in which a processing circuit (e.g., processing circuit(s) 110, GPU 250) having a set of functional blocks (e.g., fragment pipe 275 of GPU 250) maintains utilization values in a set of performance counter registers (e.g., performance counters 105), the utilization values being indicative of the utilization of associated ones of the set of functional blocks.

In 720, the processing circuit periodically samples the performance counter registers for the set of functional blocks, where the periodically sampling includes aggregating utilization values in the sampled performance counter registers at 730. Then, at 740, the processing circuit stores the aggregated utilization values in a set of trace buffers (e.g., trace buffers 530) that is configured to generate time-domain and frequency-domain representations of utilization of the processing circuit.

In some embodiments, the processing circuit determines, based on a sensitivity between frequency and performance, at least one of the set of functional blocks that is currently acting as a hardware limiter for the processing circuit. In some embodiments, the sensitivity between frequency and performance is determined by using work information and stall information for individual ones of the set of functional blocks that are sampled from performance counter registers, the work information and the stall information for a given functional block being indicative of an amount of work and an amount of stalling for the given functional block.

Next, in 750, the processing circuit determines, in real time based on information stored in the set of trace buffers, whether to change its performance state. Accordingly, the processing circuit may operate in a particular mode in which it dithers between two performance states, the timing of the dithering being selected based on the time-domain representation of the utilization of the processing circuit stored in the set of trace buffers.

Example Device

Figure 8:
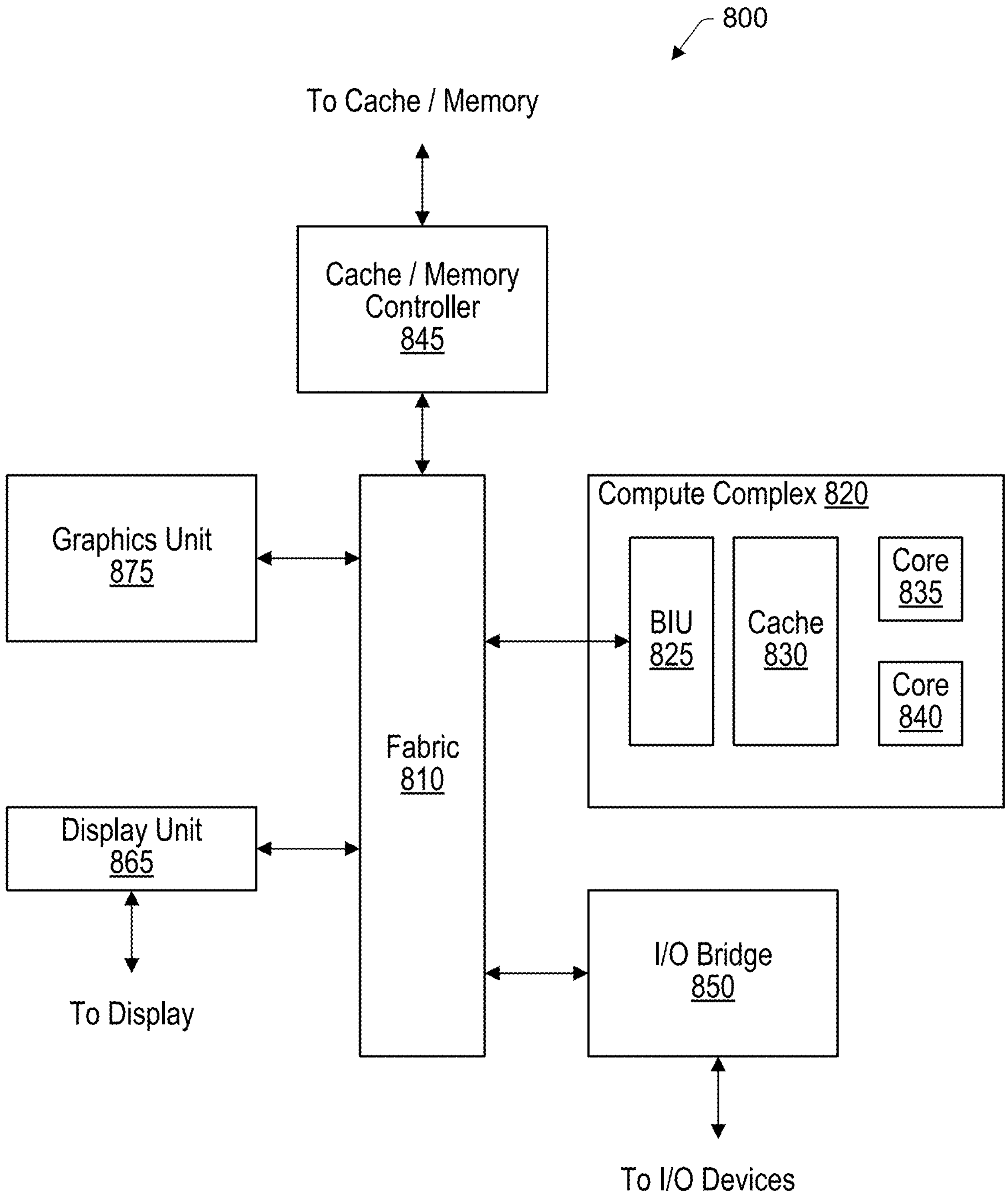
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
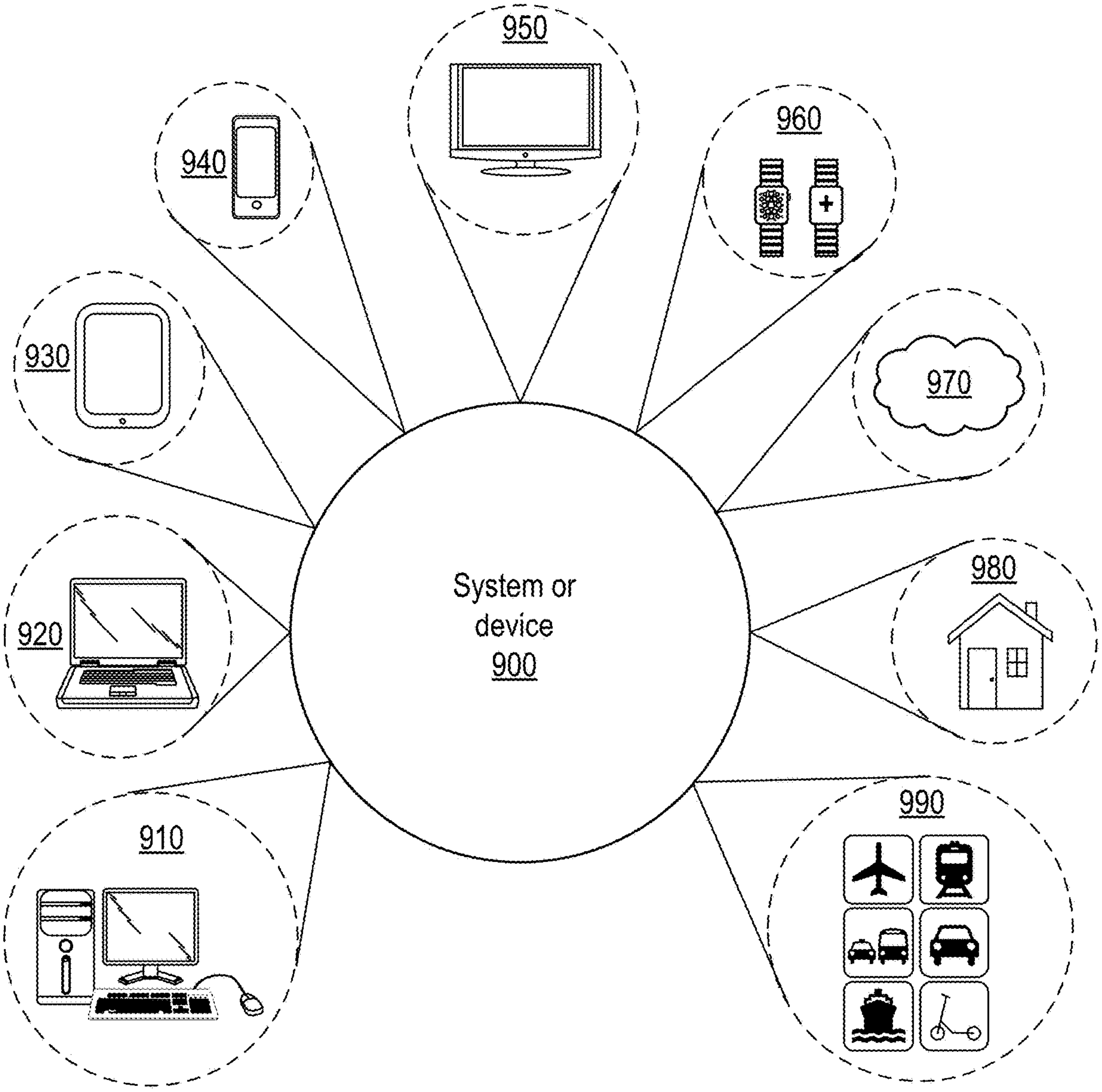
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
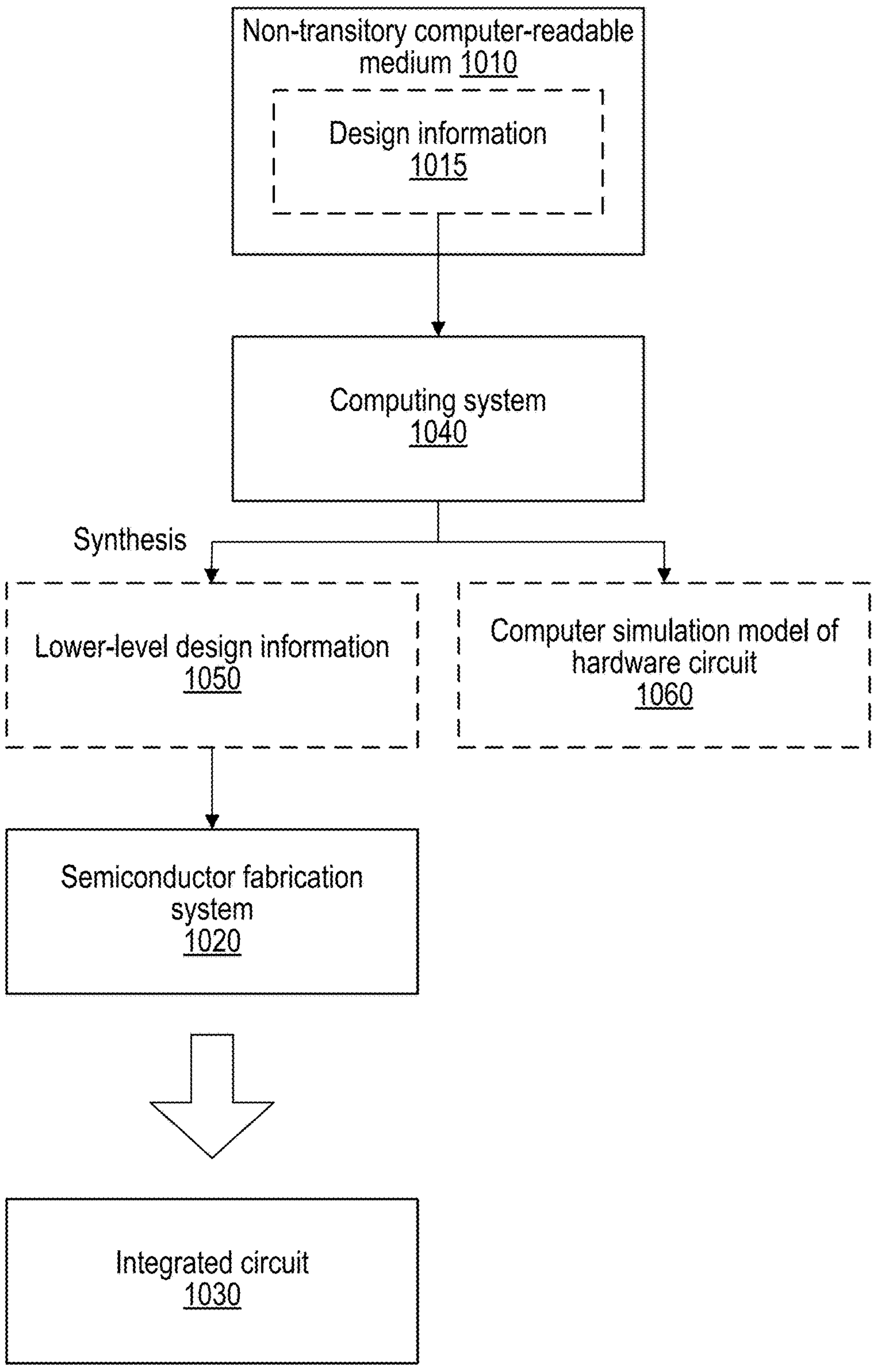
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in the hardware diagrams shown above. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as “units” (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular “decode unit” may be described as performing the function of “processing an opcode of an instruction and routing that instruction to one or more of a plurality of functional units,” which means that the decode unit is “configured to” perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:

a processing circuit that includes a set of functional block circuits and performance counter registers, the performance counter registers configured to store utilization values indicative of utilization of associated ones of the set of functional block circuits;

a set of trace buffer circuits;

a register interface circuit configured to, during operation of the processing circuit:

periodically sample the processing circuit to obtain aggregated utilization values generated from utilization values stored in the performance counter registers; and write the aggregated utilization values to the set of trace buffer circuits; and a power management processor circuit configured to utilize a set of information stored in the set of trace buffer circuits to determine whether to change a performance state of the processing circuit, the set of information including time-domain and frequency-domain representations of utilization of the processing circuit that are generated from the aggregated utilization values, wherein the frequency-domain representation describes a prevalence of different utilization bins during a sampling interval, and the time-domain representation describes a change in utilization across time during the sampling interval.

2. The apparatus of claim 1, wherein the register interface circuit is further configured to, during operation of the processing circuit:

periodically sample the processing circuit to obtain values indicative of work information and stall information for individual ones of the set of functional block circuits; and write the work information and the stall information to the set of trace buffer circuits.

3. The apparatus of claim 2, wherein the power management processor circuit is configured to utilize the values indicative of the work information and the stall information for individual ones of the set of functional block circuits to determine one or more functional block circuits that are hardware limiters for the processing circuit.

4. The apparatus of claim 3, wherein the values indicative of the work information and the stall information are usable to compute a relationship between frequency dependence and performance for individual ones of the set of functional block circuits.

5. The apparatus of claim 3, wherein the power management processor circuit is configured to identify those ones of the set of functional block circuits that have performance that is 100 percent sensitive to frequency as the hardware limiters.

6. The apparatus of claim 1, wherein a given utilization value is indicative of switching capacitance of a corresponding one of the set of functional block circuits.

7. The apparatus of claim 6, wherein the set of trace buffer circuits includes a histogram circuit configured to store a distribution of average switching capacitance for the processing circuit between different ranges of switching capacitance over a sampling period.

8. The apparatus of claim 7, wherein the histogram circuit is further configured to store average switching capacitance for samples taken during the sampling period.

9. The apparatus of claim 1, wherein the register interface circuit is configured to, for a particular sample of the processing circuit, simultaneously determine an average aggregated utilization value, a maximum aggregated utilization value, and a minimum aggregated utilization value.

10. The apparatus of claim 1, wherein the power management processor circuit is configured to operate in a max thermal mode in which the processing circuit has a specified power budget and dithering is performed between two p-states, in which the timing of the two p-states is selected based on the time-domain representation of utilization of the processing circuit stored in the set of trace buffer circuits.

11. The apparatus of claim 1, wherein the power management processor circuit is configured to operate in a max current mode in which the processing circuit attempts to reduce current throttles by transitioning to a lower p-state during utilization peaks and by transitioning to a higher p-state during utilization valleys.

12. A method, comprising:

maintaining, in a graphics processing unit (GPU) having a set of functional block circuits, utilization values in a set of performance counter registers, the utilization values being indicative of the utilization of associated ones of the set of functional block circuits;

periodically sampling, by the GPU, the performance counter registers for the set of functional block circuits, wherein the periodically sampling includes:

aggregating, by the GPU, utilization values in the sampled performance counter registers; and storing, by the GPU, the aggregated utilization values in a set of trace buffer circuits that is configured to generate time-domain and frequency-domain representations of utilization of the GPU, wherein the frequency-domain representation identifies a number of samples counted for defined ranges of utilization percentages over a sampling period; and determining, by the GPU in real time based on information stored in the set of trace buffer circuits, whether to change a performance state of the GPU.

13. The method of claim 12, the method further comprising:

determining, by the GPU based on a sensitivity between frequency and performance, at least one of the set of functional block circuits that is currently acting as a hardware limiter for the GPU.

14. The method of claim 13, wherein the sensitivity between frequency and performance is determined by using work information and stall information for individual ones of the set of functional blocks that are sampled from performance counter registers, the work information and the stall information for a given functional block circuit being indicative of an amount of work and an amount of stalling for the given functional block circuit.

15. The method of claim 12, the method further comprising:

operating, by the GPU in a particular mode in which the GPU dithers between two performance states, the timing of the dithering being selected based on the time-domain representation of the utilization of the GPU stored in the set of trace buffer circuits.

16. An apparatus, comprising:

a processing circuit that includes a set of functional block circuits and performance counter registers, the performance counter registers configured to store values indicative of performance of associated ones of the set of functional block circuits;

a set of trace buffer circuits;

a register interface circuit configured to, during operation of the processing circuit:

sample the performance counter registers over the course of a time period corresponding to a graphics frame;

write values from the sampled performance counter registers to the set of trace buffer circuits; and a power management processor circuit configured to utilize a set of information stored in the set of trace buffer circuits to determine which of the set of functional block circuits is a current hardware limiter that is a current performance bottleneck for the processing circuit under a current workload, and determine, in real time based on the current hardware limiter, whether to change a performance state of the processing circuit.

17. The apparatus of claim 16, wherein the set of trace buffer circuits includes work information and stall information for individual ones of the set of functional block circuits, and wherein the power management processor circuit is configured to use the work information and stall information to determine which of the set of functional block circuits is the current hardware limiter.

18. The apparatus of claim 17, wherein the current hardware limiter is determined by using the work and stall information to identify one or more of the set of functional block circuits that has performance that is 100 percent sensitive to frequency.

19. The apparatus of claim 16, wherein the register interface circuit is configured to, during operation of the processing circuit, sample the performance counter registers to obtain individual utilization values for ones of the set of functional block circuits.

20. The apparatus of claim 19, wherein the register interface circuit is configured to, during operation of the processing circuit, obtain aggregated utilization values generated from the individual utilization values; and wherein the set of information includes time-domain and frequency-domain representations of utilization of the processing circuit.

* * * * *